United States Patent
Minami et al.

(10) Patent No.: US 7,800,765 B2
(45) Date of Patent: Sep. 21, 2010

(54) LIGHT PROJECTION OPTICAL SYSTEM AND LIGHT PROJECTION APPARATUS USING THE SAME

(75) Inventors: Shigeyuki Minami, Musashino (JP); Toshihide Nozawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 791 days.

(21) Appl. No.: 11/805,397

(22) Filed: May 22, 2007

(65) Prior Publication Data
US 2007/0273847 A1 Nov. 29, 2007

(30) Foreign Application Priority Data
May 23, 2006 (JP) ............................. 2006-143169

(51) Int. Cl.
*G01B 11/14* (2006.01)

(52) U.S. Cl. ...................................... 356/614
(58) Field of Classification Search ....................... None
See application file for complete search history.

(56) References Cited

U.S. PATENT DOCUMENTS

| | | | | |
|---|---|---|---|---|
| 5,731,577 A | * | 3/1998 | Tanitsu | 250/201.5 |
| 5,808,759 A | * | 9/1998 | Okamori et al. | 359/15 |
| 5,859,721 A | | 1/1999 | Oka | |

FOREIGN PATENT DOCUMENTS

JP 08-297255 11/1996

* cited by examiner

*Primary Examiner*—Tu T Nguyen
(74) *Attorney, Agent, or Firm*—Kenyon & Kenyon LLP

(57) ABSTRACT

There is disclosed a light projection optical system comprising a light source; a relay lens unit which has a negative lateral magnification and which converts a luminous flux that has diverged from the light source into converged light; and a projection lens unit which reduces a divergent angle of the luminous flux from the relay lens unit to convert a state of the luminous flux into a state close to that of a parallel luminous flux and which projects light toward a target region, wherein the following conditions are satisfied:

$$0.9 < \beta r < 3.0 \quad (1); \text{ and}$$

$$1.0 < (1+\beta r)(fr/|fo|) < 6.0 \quad (2),$$

in which $\beta r$ is an absolute value of the lateral magnification of the relay lens unit, $fr$ is a focal length of the relay lens unit and $fo$ is a focal length of the projection lens unit.

22 Claims, 14 Drawing Sheets

HORIZONTAL DIRECTION (DEGREE)

VERTICAL DIRECTION (DEGREE)

INTENSITY DISTRIBUTION IN VERTICAL DIRECTION

INTENSITY DISTRIBUTION IN HORIZONTAL DIRECTION

LIGHT PROJECTION OPTICAL SYSTEM AND LIGHT PROJECTION APPARATUS USING THE SAME

CROSS REFERENCE TO RELATED APPLICATIONS

This application claims benefit under 35 U.S.C. §119 of Japanese patent application of No. 2006-143,169 filed in Japan on May 23, 2006, the contents of which are incorporated herein by reference.

BACKGROUND OF THE INVENTION

1. Field of the Invention

The present invention relates to a light projection optical system and a light projection apparatus including the system.

2. Description of the Related Art

A distance measurement apparatus is known in which a luminous flux is projected to a predetermined region (a target region) with a light projection apparatus to measure a distance to a certain object in the target region from information of reflected light of the luminous flux. The light projection apparatus of a scanning type is known in which the projected luminous flux is scanned to move the projection region so as to acquire distance information of the large target region.

A light projection optical system mounted on such a light projection apparatus is demanded to efficiently condense light emitted by a light source and obtain an appropriate intensity distribution of the projected luminous flux. For example, if the intensity distribution excessively enlarges, information of an object other than a target to be measured is included in the reflected light as a noise component. This causes a drop in measurement precision. On the other hand, if the intensity distribution is excessively small, only information of a specific portion of the target can be obtained, and this results in lack of information.

Moreover, in addition to the function of scanning the projection region, there is sometimes a demand for a function of moving the projection region to an arbitrary position to fix the region at the position. Examples in which such a function is utilized are considered to include a case where a movement situation of a specific target is measured and an application in which detailed information of the target is acquired.

On the other hand, it is demanded that the light projection optical system and the light projection apparatus on which this system is mounted be miniaturized and lightened. It is also demanded that energy be saved and that luminance be increased.

Moreover, in recent years, as the light sources of the light projection optical system, a semiconductor laser and a light emitting diode (LED) have been used. These light sources have high output and long life.

In general, when a numerical aperture (NA) on a light source side is increased, more light emitted from the light source can be taken. To increase the NA on the light source side, a projection lens needs to be arranged close to the light source, or a diameter of the projection lens needs to be increased. However, when interference with a member or the like constituting a light source section is considered, there is a restriction in arranging the projection lens close to the light source. On the other hand, when the diameter of the projection lens is increased, a scanning member and the like have to be increased in size. This obstructs the miniaturization.

In Japanese Patent Application Laid-Open No. 8-297255, a scanning type light projection optical system is described in which the light source is once imaged and the NA on the light source side is increased to secure a quantity of light.

BRIEF SUMMARY OF THE INVENTION

According to one aspect of the present invention, a light projection optical system comprises:

a light source;

a relay lens unit which has a negative lateral magnification and which converts a luminous flux that has diverged from the light source into converged light; and a projection lens unit which reduces a divergent angle of the luminous flux from the relay lens unit to convert a state of the luminous flux into a state close to that of a parallel luminous flux and which projects light toward a target region, wherein the following conditions are satisfied:

$$0.9 < \beta r < 3.0 \quad (1); \text{ and}$$

$$1.0 < (1+\beta r)(fr/|fo|) < 6.0 \quad (2),$$

in which $\beta r$ is an absolute value of the lateral magnification of the relay lens unit, $fr$ is a focal length of the relay lens unit and $fo$ is a focal length of the projection lens unit.

According to another aspect of the present invention, a light projection optical system comprises:

a light source;

a relay lens unit which has a negative lateral magnification and which converts a luminous flux that has diverged from the light source into converged light; and a projection lens unit which reduces a divergent angle of the luminous flux from the relay lens unit to convert a state of the luminous flux into a state close to that of a parallel luminous flux and which projects light toward a target region, wherein the whole projection lens unit or a part of the projection lens unit is decentered to change a projection region.

According to a further aspect of the present invention, a light projection apparatus comprises:

the light projection optical system according to the above aspect; and a detector which receives a luminous flux projected from the light projection optical system and reflected by a target in order to acquire positional information of the target.

According to the present invention, a small-sized light projection optical system and a light projection apparatus including the system can be provided.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE PREFERRED EMBODIMENT

Figure 1:
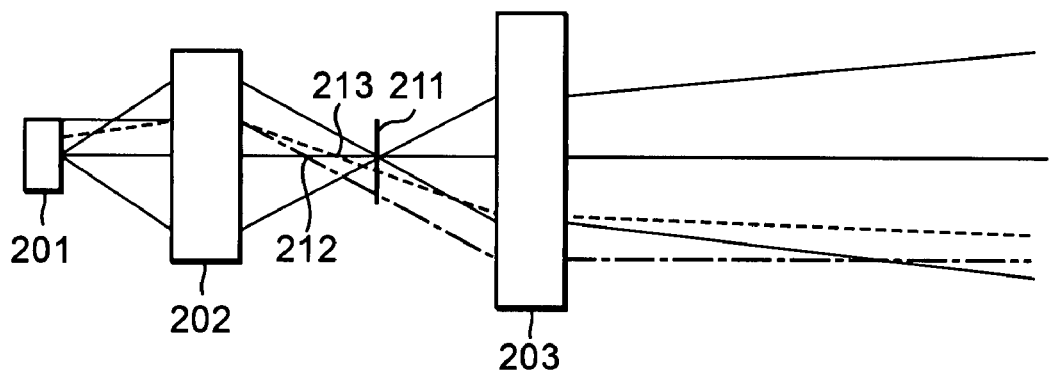
FIG. 1 is a paraxial conceptual diagram of a light projection optical system according to an embodiment of the present invention.

FIG. 1 is a conceptual diagram of an example of a light projection optical system according to the present invention. As shown in FIG. 1, the light projection optical system has a light source 201, a relay lens unit 202 and a projection lens unit 203. The relay lens unit 202 and the projection lens unit 203 are arranged in order from a light source 201 side. The relay lens unit 202 has a negative lateral magnification, and converges a luminous flux which has diverged from the light source 201 into converged light. The projection lens unit 203 receives the luminous flux from the relay lens unit 202, reduces a divergent angle of the luminous flux to convert the luminous flux into a luminous flux close to a parallel luminous flux, and projects light toward a target.

The light source 201 and the relay lens unit 202 are arranged in such a positional relation that an absolute value βr of the lateral magnification of a light source image 211 formed by the relay lens unit 202 is approximately 0.9<βr<3.0. The relay lens unit 202 and the projection lens unit 203 are arranged so that a front focal point 213 of the projection lens unit 203 is positioned between a rear focal point 212 of the relay lens unit 202 and the light source image 211.

Figure 2:
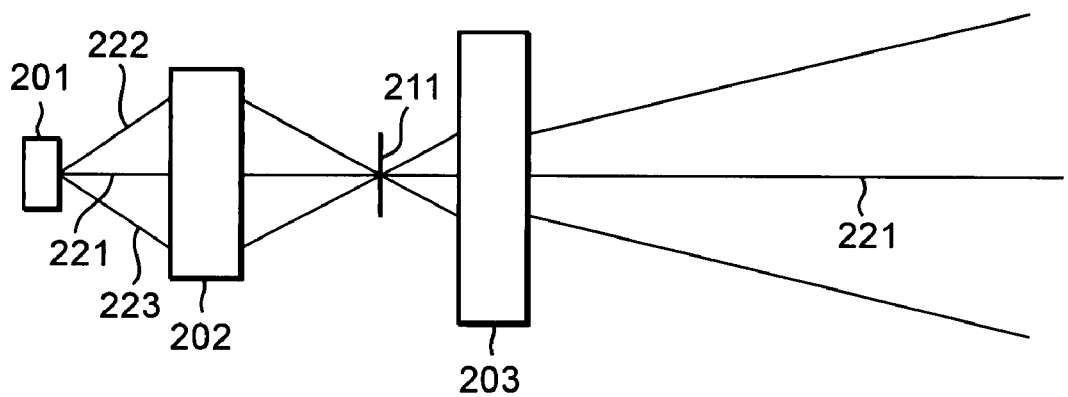
FIG. 2 illustrates a behavior of a luminous flux emitted from the center of a light source in a case where a position of a front focal point of a projection lens unit substantially agrees with that of a rear focal point of a relay lens unit in a light projection optical system of FIG. 1.
Figure 3:
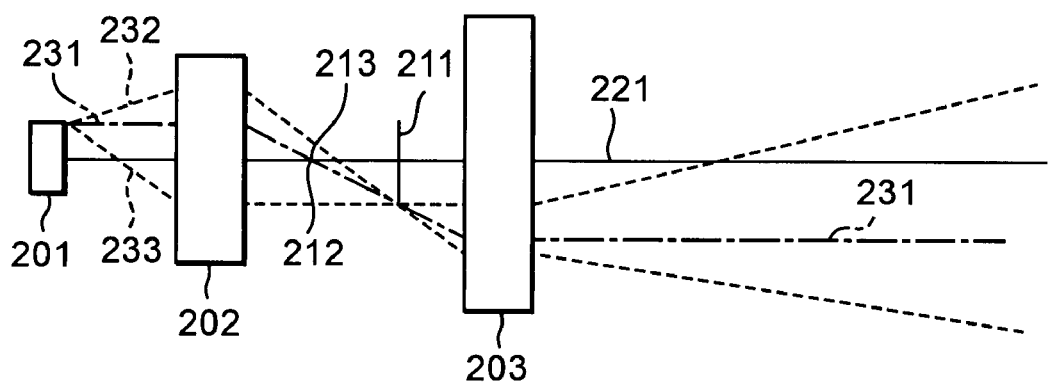
FIG. 3 illustrates a behavior of a luminous flux emitted from a peripheral portion of the light source in a case where the position of the front focal point of the projection lens unit substantially agrees with that of the rear focal point of the relay lens unit in the light projection optical system of FIG. 1.
Figure 4:
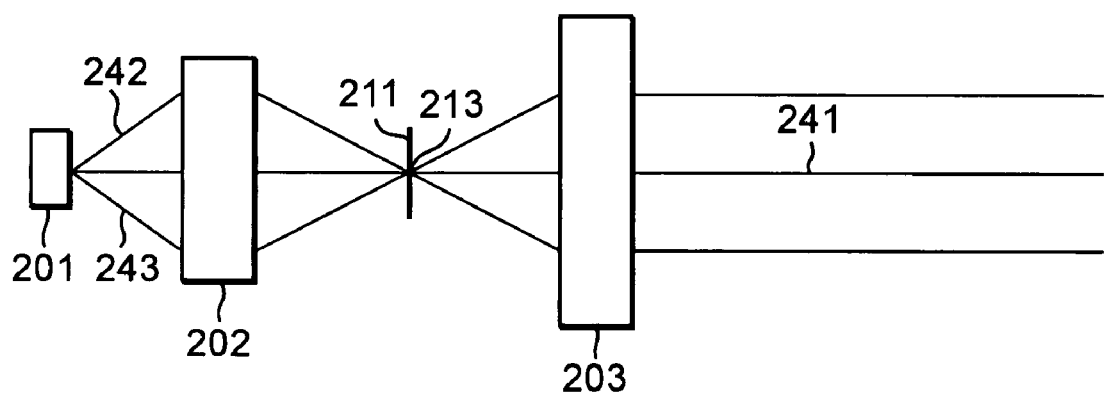
FIG. 4 illustrates a behavior of the luminous flux emitted from the center of the light source in a case where the position of the front focal point of the projection lens unit substantially agrees with that of a light source image formed by the relay lens unit in the light projection optical system of FIG. 1.
Figure 5:
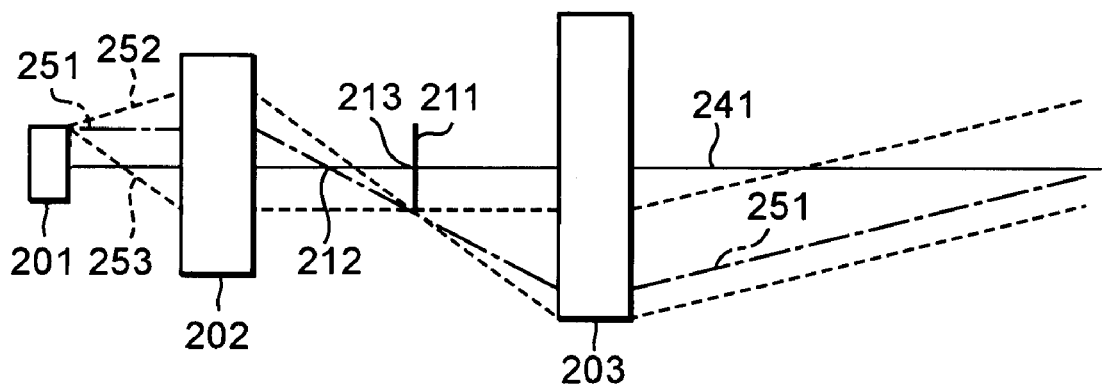
FIG. 5 illustrates a behavior of the luminous flux emitted from the peripheral portion of the light source in a case where the position of the front focal point of the projection lens unit substantially agrees with that of the light source image formed by the relay lens unit in the light projection optical system of FIG. 1.

FIGS. 2 and 3 illustrate an example in which a position of the front focal point 213 of the projection lens unit 203 substantially agrees with that of the rear focal point 212 of the relay lens unit 202. FIGS. 4 and 5 illustrate an example in which the position of the front focal point 213 of the projection lens unit 203 substantially agrees with that of the light source image 211 (a position which is conjugated with the light source 201 with respect to the relay lens unit). For easy understanding of the description, FIGS. 2 and 4 illustrate a behavior of the luminous flux emitted from the center of the light source, and FIGS. 3 and 5 illustrate a behavior of the luminous flux emitted from a peripheral portion of the light source.

In FIG. 2, since a ray 221 perpendicularly emitted from the center of a light emitting section of the light source 201 agrees with an optical axis of the relay lens unit 202, the ray rectilinearly travels without being bent. The luminous flux emitted from the center of the light source 201 has high intensity in the vicinity of this ray. Rays 222, 223 obliquely emitted from the center of the light source 201 cross the ray 221 on the surface of the light source image 211 owing to a function of the relay lens unit 202. These rays again diverge after passing the light source image 211, and enter the projection lens unit 203. Owing to a function of the projection lens unit 203, divergences of these rays are reduced. That is, a divergent angle is reduced. As a result, a luminous flux close to a parallel luminous flux is formed by the projection lens unit 203. This luminous flux is projected to a target (not shown). Since the divergences are reduced at the projection lens unit 203, a luminous flux density increases on a projection surface, that is, a target surface, and a projection region is also reduced. In FIG. 3, since a ray 231 perpendicularly emitted from the peripheral portion of the light source 201 is parallel to an optical axis of the relay lens unit 202, the ray crosses the optical axis at the position of the rear focal point 212 of the relay lens unit 202. Since this position agrees with that of the front focal point 213 of the projection lens unit 203, the ray 231 is emitted from the projection lens unit 203 in parallel with the ray 221. The luminous flux emitted from the peripheral portion of the light source 201 has high intensity in the vicinity of this ray. Rays 232, 233 obliquely emitted from the peripheral portion of the light source 201 crosses the ray 231 on the surface of the light source image 211 owing to the function of the relay lens unit 202, and enters the projection lens unit 203 while diverging again. The divergences of these rays are reduced owing to the function of the projection lens unit 203, the density of luminous fluxes on the projection surface increases, and a region of the luminous fluxes is also reduced. As a whole, the luminous flux emitted from the light source 201 forms the projected luminous flux having high intensity substantially in the same direction while slightly diverging.

In FIG. 4, since a ray 241 vertically emitted from the center of the light source 201 to the light emitting section agrees with the optical axis of the relay lens unit 202, the ray rectilinearly travels without being bent. The luminous flux emitted from the center of the light source 201 has high intensity in the vicinity of this ray. Rays 242, 243 obliquely emitted from the center of the light source 201 cross the ray 241 cross the ray 241 on the surface of the light source image 211 owing to the function of the relay lens unit 202, and enter the projection lens unit 203 while diverging again. These rays are parallel to the ray 241 owing to the function of the projection lens unit 203. That is, the luminous flux emitted from one point of the light source is paraxially emitted as a parallel luminous flux from the projection lens unit 203 (if there is not any aberration of the lens). In FIG. 5, since a ray 251 vertically emitted from an upper peripheral portion of the light source 201 is parallel to the optical axis of the relay lens unit 202, the ray crosses the optical axis at the position of the rear focal point 212 of the relay lens unit 202. In contrast to this position, the front focal point 213 of the projection lens unit 203 is positioned on a projection side including the target. Therefore, the ray 251 is emitted from the projection lens unit 203 in an upwardly tilted direction. The luminous flux emitted from the peripheral portion of the light source 201 has high intensity in the vicinity of this ray. Rays 252, 253 obliquely emitted from the peripheral portion of the light source 201 cross the ray 251 on the surface of the light source image 211 owing to the function of the relay lens unit 202, and enter the projection lens unit 203 while diverging again. These rays are emitted in parallel with the ray 251 owing to the function of the projection lens unit 203. As a whole, the luminous flux emitted from the light source is a projected luminous flux having high intensity substantially in the same direction while slightly diverging.

As seen from FIGS. 2 to 5, in a case where the projection lens unit 203 is arranged so that the front focal point of the projection lens unit is positioned between the vicinity of the rear focal point of the relay lens unit 202 and the vicinity of the light source image, the luminous flux which has diverged from the light source comes close to a parallel state, and uniformity of an intensity distribution can be improved. As a result, it is possible to form the light projection optical system having a satisfactory condensed state on the projection surface.

Figure 6:
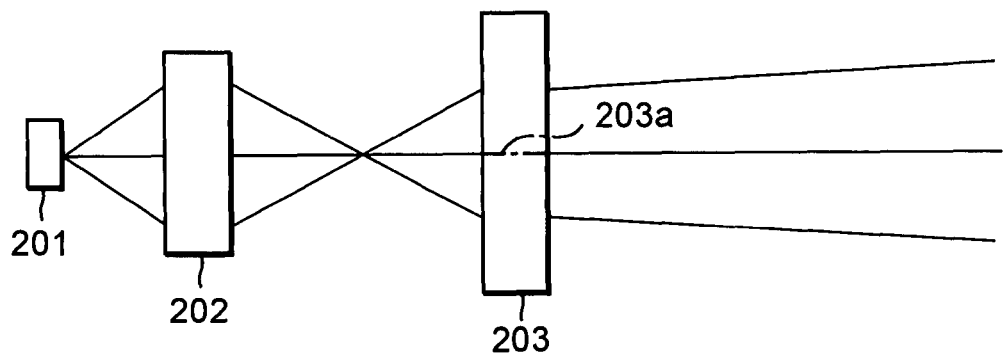
FIG. 6 illustrates a state in which a central ray is projected so as to travel rectilinearly in the light projection optical system of FIG. 1.
Figure 7:
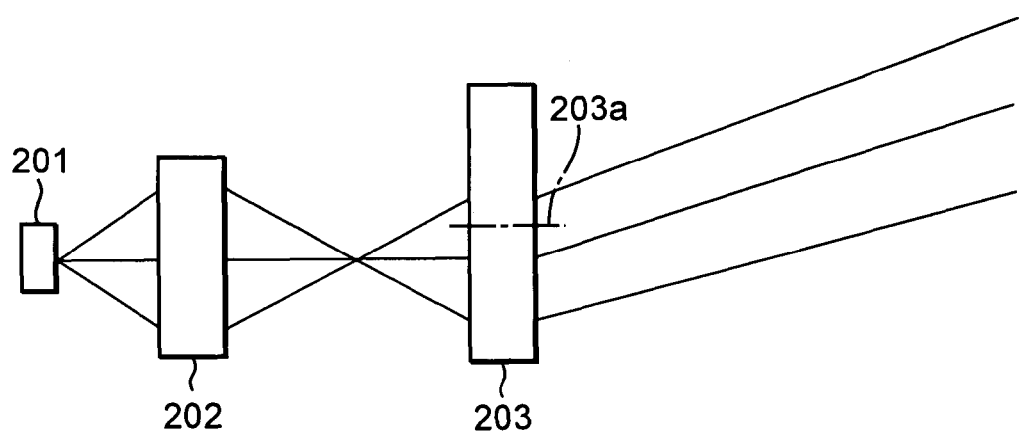
FIG. 7 illustrates a state in which the projection lens unit is decentered in an upward direction with respect to the state of FIG. 6.
Figure 8:
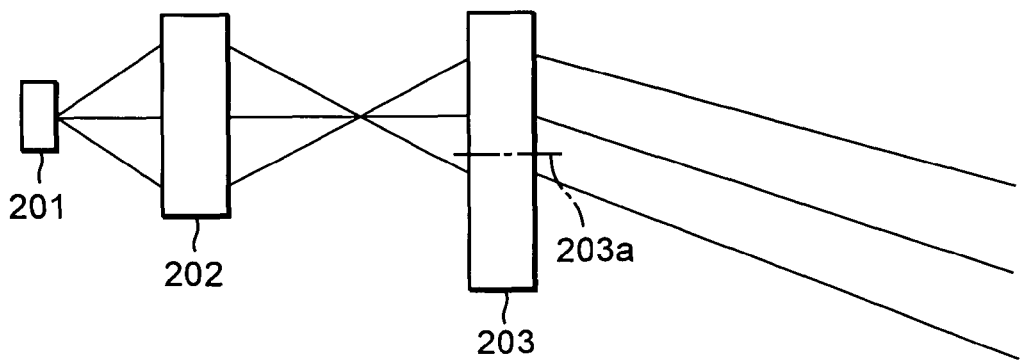
FIG. 8 illustrates a state in which the projection lens unit is decentered in a downward direction with respect to the state of FIG. 6.

Next, an operation of changing the projection region in the above light projection optical system will be described. FIG. 6 illustrates a state in which a central ray, that is, a ray perpendicularly emitted from the center of the light source 201 is projected so as to travel rectilinearly, and FIGS. 7 and 8 are diagrams illustrating a state in which the projection lens unit 203 is decentered in an upward direction and a downward direction, respectively, with respect to the state of FIG. 6. In FIG. 6, since an optical axis 203a of the projection lens unit 203 is positioned along the central ray of the luminous flux, the luminous flux is not deflected by the projection lens unit 203. On the other hand, in FIGS. 7 and 8, since the optical axis 203a of the projection lens unit 203 deviates from the central ray of the luminous flux, the luminous flux is deflected by the projection lens unit 203. A degree of the luminous flux deflected by the projection lens unit 203 depends on an amount of the optical axis 203a of the projection lens unit 203 deviating from the central ray of the luminous flux, that is, an eccentricity. Therefore, when the eccentricity of the projection lens unit 203 is controlled, a deflecting function of the projection lens unit 203 with respect to the central ray can be changed to arbitrarily change a projecting direction. That is, when the projection lens unit 203 is decentered to change an amount of eccentricity, the projection region can be changed. As compared with a technique in which a known polygon mirror is used, a technique of decentering a part of the light projection optical system in this manner is advantageous for miniaturization of the system. A method of decentering the projection lens unit 203 may be a method of shifting the projection lens unit in a direction perpendicular to the optical axis of the relay lens unit 202 or a method of tilting the optical axis of the projection lens unit 203 with respect to that of the relay lens unit 202. A driving system can easily be constituted by the former method, and disturbance of the luminous flux can be reduced by the latter method.

In the present embodiment, the light source 201 may be constituted of at least one of, for example, a plurality of point light sources, a linear light source and a planar light source. A light emitting section of the light source 201 is preferably linear or rectangular. In consequence, a quantity of light to be emitted can be increased as compared with the point light sources. The light source 201 is constituted of, for example, a light emitting diode or a semiconductor laser.

The relay lens unit 202 preferably includes a positive lens provided with the surface thereof on an emission side having an absolute value of curvature which is larger than that of the surface thereof on a light source side and a positive lens provided with the surface thereof on the light source side having an absolute value of curvature which is larger than that of the surface thereof on the emission side. In consequence, while a constitution of the relay lens unit 202 is simplified, the NA of the relay lens unit on the light source side is increased and spherical aberrations can be reduced. Therefore, owing to the increase of the NA together with an effect of the decrease of the aberrations, the uniformity of the intensity distribution of the light source image can be improved. Even if an area and a length of the light source increase, this constitution is advantageous in that influences of the aberrations can be reduced. The two positive lenses of the relay lens unit 202 have the same shape, and are arranged so that the surfaces thereof having large absolute values of curvatures face each other. In consequence, costs can be reduced by use of a common member. The two positive lenses of the relay lens unit 202 may be formed of a resin. This can reduce the costs. Furthermore, the two positive lenses may include resin lenses having the same shape. This constitution is cost-effective because molds and molding machines required for molding the lenses can be reduced.

In the relay lens unit 202, for example, at least one lens surface is an aspherical surface classified as a quadratic surface. In consequence, divergent marginal rays can be converged to the center, and the intensity distribution of the emitted light can be uniformed.

Figure 24:
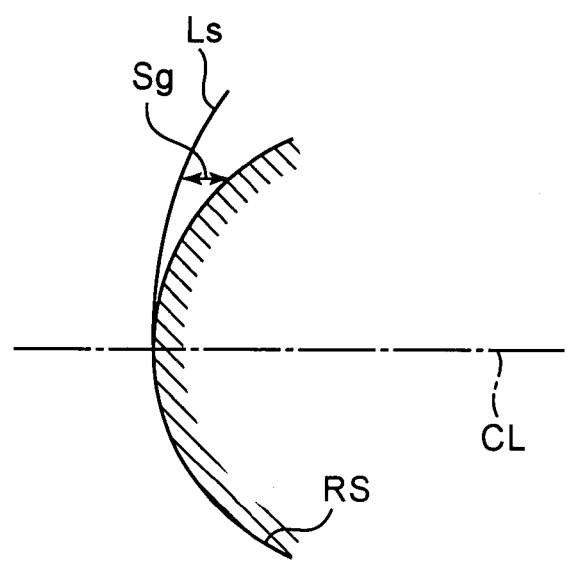
FIG. 24 is a diagram describing a departure of an aspherical surface from a reference spherical surface.

As shown in, for example, FIG. 24, at least one lens surface LS of the relay lens unit 202 has such an aspherical shape that a departure Sg at a portion on the aspherical surface from a reference spherical surface RS to a space side increases as the portion comes away from an optical axis CL. Here, the reference spherical surface is a virtual spherical surface having the same vertex as that of the aspherical surface and having a radius which is a paraxial radius of curvature of the aspherical surface. In consequence, the spherical aberrations easily generated in a peripheral portion of the lens surface are easily suppressed. Even if the NA on a light source 201 side is increased, satisfactory optical performances can be obtained.

The projection lens unit 203 preferably has a positive refractive power. In consequence, the projection lens unit 203 may be disposed apart from the relay lens unit 202. Therefore, interference between the projection lens unit 203 and the relay lens unit 202 does not easily occur. Since an absolute value of the refractive power is easily reduced (a focal length is easily increased), the constitution is advantageous in securing the optical performance of the projection lens unit 203. It is easily constituted that the projection region can largely be moved with a small eccentricity.

The light projection optical system of the present embodiment satisfies the following condition:

$$0.9 < \beta r < 3.0 \quad (1).$$

The system further preferably satisfies the following condition:

$$1.1 < \beta r < 2.5 \quad (1a),$$

in which $\beta r$ is an absolute value of the lateral magnification of the relay lens unit 202. The conditions (1) and (1a) define an appropriate magnification range of the relay lens unit, and are set in consideration of the miniaturization of the relay lens unit 202 while securing the NA on the light source 201 side to secure brightness. When $\beta r$ is not below a lower limit of the condition (1), the NA of the relay lens unit 202 on a light condensing side (a projection lens unit 203 side) is inhibited from being excessively increased, and the absolute value of the refractive power of the projection lens unit 203 is reduced to easily maintain the optical performances. Alternatively, the NA of the relay lens unit 202 on the light source 201 side is inhibited from being excessively decreased, and the brightness is easily secured. When $\beta r$ is not above an upper limit of the condition (1), the light source image 211 formed by the relay lens unit 202 is inhibited from excessively coming away from the light source 201, and this constitution is advantageous for miniaturization of the relay lens unit 202.

In addition to condition (1), the light projection optical system of the present embodiment preferably satisfies the following condition:

$$1.0 < (1+\beta r)(fr/|fo|) < 6.0 \quad (2).$$

Further preferably, the following condition is satisfied:

$$1.2 < (1+\beta r)(fr/|fo|) < 5.0 \quad (2a),$$

in which $\beta r$ is an absolute value of the lateral magnification of the relay lens unit 202, fr is a focal length of the relay lens unit 202, and fo is a focal length of the projection lens unit 203. The conditions (2) and (2a) define a relation between the magnification and the focal length of the relay lens unit 202 so as to set the focal length of the projection lens unit 203 to be suitable for obtaining an appropriately small distance between the light source image 211 and the projection lens unit 203 as long as the condition (1) is satisfied. When $(1+\beta r)(fr/|fo|)$ is not below a lower limit of the condition (2), an increase in a diameter of the projection lens unit 203 is suppressed. When $(1+\beta r)(fr/|fo|)$ is not above an upper limit condition (2), the absolute value of the refractive power of the projection lens unit 203 is inhibited from being excessively increased, and the optical performance is easily secured.

Moreover, in the light projection optical system of the present embodiment, the projection lens unit 203 preferably has a positive refractive power. The system preferably satisfies the following condition:

$$-0.1 < Drt/Dri < 1.1 \quad (3).$$

The system further preferably satisfies the following condition:

$$0.1 < Drt/Dri < 1.0 \quad (3a).$$

The system still further preferably satisfies the following condition:

$$0.5 < Drt/Dri < 0.98 \quad (3b),$$

in which Drt is a distance from a target side focal point of the relay lens unit 202 to a light source side focal point of the projection lens unit 203, and Dri is a distance from the target side focal point of the relay lens unit 202 to the light source image formed by the relay lens unit 202. The conditions (3), (3a) and (3b) are determined in consideration of a balance between an effect of reducing divergence of light emitted from each light emitting point of the light emitting section of the light source 201 and an effect of projecting a chief ray emitted from each light emitting point, that is, a ray having high intensity in the luminous flux diverged from each light emitting point in the same direction. When Drt/Dri is not below a lower limit and also not above an upper limit of the condition (3), divergence of the luminous flux to be projected is easily suppressed.

It is to be noted that the relay lens unit 202 and the projection lens unit 203 do not have to be necessarily arranged along a common optical axis. For example, a position of the projection lens unit 203 on a light source 201 side may be set to a position deviating from the optical axis of the relay lens unit in accordance with a shape of a light emitting section of the light source 201. Even in this case, a value of Drt is measured along the optical axis of the relay lens unit 202. The value of Drt may be adjusted in accordance with a shape of the light emitting section of the light source 201.

The projection lens unit 203 may include an optical unit having a positive refractive power and an optical unit having a negative refractive power in order from the light source 201 side as viewed in a section of the projection lens unit 203 including the central ray. In consequence, a divergent luminous flux from a conjugated image of the light source 201 is condensed by the optical unit having the positive refractive power, and the optical unit having a negative refractive power can be miniaturized. In this case, instead of the whole projection lens unit 203, the optical unit having the positive refractive power may be decentered to change the projection region. A focal length of the optical unit having the positive refractive power can be set to be smaller than that of the projection lens unit 203. Therefore, this optical unit having the positive refractive power can be decentered to easily change the projection region with a small movement. Furthermore, the projection lens unit 203 preferably has the positive refractive power as a whole, and satisfies the following condition:

$$-6.0 < \Phi p/\Phi n < -1.5 \quad (4).$$

The following condition is further preferably satisfied:

$$-3.5 < \Phi p/\Phi n < -1.0 \quad (4a),$$

in which $\Phi p$ is a refractive power of the optical unit of the projection lens unit 203 having the positive refractive power, and $\Phi n$ is a refractive power of the optical unit of the projection lens unit 203 having the negative refractive power. The conditions (4) and (4a) define a ratio of the refractive powers of the optical units in order to reduce the movement of a movable unit constituting the projection lens unit 203. When Φp/Φn is not below a lower limit of the condition (4), the refractive power of the optical unit having the negative refractive power is secured, and the eccentricity of the positive refractive power can be suppressed. When Φp/Φn is not above an upper limit of the condition (4), the refractive power of the optical unit having the negative refractive power is prevented from being excessively increased, and the divergence of the marginal ray can easily be suppressed.

The above-mentioned optical unit having the positive refractive power preferably includes one positive lens. In consequence, a movable lens unit can preferably be lightened. At this time, the spherical aberrations generated in the positive lens may be canceled by the optical unit having the negative refractive power.

At least one lens surface of the projection lens unit 203 is preferably an aspherical surface. When an aspherical shape of the projection lens unit 203 is optimized, the intensity distribution at a time when the projection lens unit is moved can be adjusted.

In addition to the condition (4), the projection lens unit 203 further preferably satisfies the following condition in the section thereof including the central ray:

$$2.5 < Dpn/fo < 7.0 \quad (5).$$

The following condition is further preferably satisfied:

$$3.0 < Dpn/fo < 6.0 \quad (5a),$$

in which Dpn is an interval between a target side principal point of the optical unit having the positive refractive power and a light source side principal point of the optical unit having the negative refractive power, and fo is a focal length of the projection lens unit 203. When Dpn/fo is not below a lower limit of the condition (5), the refractive power of the projection lens unit can be suppressed. This constitution is advantageous in correcting the spherical aberrations. When Dpn/fo is not above an upper limit of the condition (5), enlargement of the projection lens unit 203 is suppressed.

In addition to the conditions (4) and (5), the following condition is more preferably satisfied by the projection lens unit 203 in the section thereof including the central ray:

$$0.4 < fr \cdot \Phi p < 1.0 \quad (6).$$

The following condition is further preferably satisfied:

$$0.55 < fr \cdot \Phi p < 0.80 \quad (6a),$$

in which fr is a focal length of the relay lens unit 202, and Φp is a refractive power of the optical unit of the projection lens unit 203 having the positive refractive power. When fr·Φp is not below a lower limit of the condition (6), the refractive power of the optical unit having the positive refractive power is secured, and the eccentricity of the optical unit is advantageously suppressed. When fr·Φp is not above an upper limit of the condition (6), the refractive power of the optical unit having the positive refractive power is inhibited from being excessively increased. Even in a simple constitution in which the optical unit having the positive refractive power includes one lens, the generation of the aberrations is reduced, and the optical performance is maintained.

Furthermore, the projection lens unit 203 includes, for example, a resin lens and a glass lens having a positive refractive power. This constitution is advantageous in a large range of temperature for use. When the refractive power to determine the focal length of the relay lens unit 202 is imparted to the glass lens and the resin lens is used for correcting the spherical aberrations, the costs can be reduced, and additionally, influences of the temperature can be reduced. The resin lens is, for example, an aspherical lens. The projection lens unit 203 preferably satisfies the following condition:

$$-0.25 < \Phi pl / \Phi gr < 0.5 \quad (7).$$

The following condition is further preferably satisfied:

$$-0.3 < \Phi pl / \Phi gr < 0.3 \quad (7a),$$

in which Φgr is a refractive power of the glass lens of the relay lens unit 202, and Φpl is a refractive power of the resin lens of the relay lens unit 202. The conditions (7) and (7a) determine a ratio between the refractive power of the glass lens and the refractive power of the resin lens in the relay lens unit 202. When Φpl/Φgr is not below a lower limit of the condition (7), the negative refractive power of the resin lens is inhibited from being excessively strengthened, and influences of temperature changes can be reduced. When Φpl/Φgr is not above an upper limit of the condition (7), the positive refractive power of the resin lens is inhibited from being excessively strengthened, and the influences of the temperature changes can be reduced.

For example, at least one surface of the projection lens unit 203 is a toric surface. When the relay lens unit 202 and the projection lens unit 203 are fixedly secured, a ratio between a projection angle on the target side in a narrow-angle direction and a projection angle in a direction perpendicular to the narrow-angle direction is 2 or more and 10 or less. Here, the narrow-angle direction is a direction which is perpendicular to the central ray of the projected luminous flux and in which the smallest projection angle is obtained. A horizontal direction is a direction perpendicular to both of the central ray and the narrow-angle direction. It is assumed that flare and ghost light generated by a ray outside abnormal optical path are not included in a projection angle range. In a case where a resolution required in measuring a target is not isotropic with respect to the central ray, a magnitude of an angle of the luminous flux projected from the light projection optical system, that is, a magnitude of the projection angle is varied with a direction in a plane perpendicular to the central ray. In consequence, an efficient system can be constituted. Therefore, it is preferable to set the ratio between the projection angle in the narrow-angle direction and the projection angle in the direction perpendicular to the narrow-angle direction to two or more by use of the toric surface in a case where the relay lens unit 202 and the projection lens unit 203 are fixedly secured. When the ratio between the projection angle in the narrow-angle direction and the projection angle in the direction perpendicular to the narrow-angle direction is not above ten, the constitution of the projection lens unit 203 is easily prevented from being complicated.

For example, at least one surface of the projection lens unit 203 is a toric surface. A light distribution characteristic of the light source 201, that is, an angular distribution of the intensity of the light emitted from the light source differs with a longitudinal direction of the light emitting section and a direction perpendicular to the longitudinal direction. In a case where the luminous flux emitted from this light emitting section is substantially converted into a parallel luminous flux to project the luminous flux, it is preferable to vary the characteristic of the light projection optical system in the longitudinal direction and in the direction perpendicular to the longitudinal direction. As a method of varying the characteristic, there is considered a method of varying the characteristic of the relay lens unit 202 and/or the projection lens unit 203. However, the light distribution characteristic has a tendency that the distribution narrows in the longitudinal direction of the light emitting section and widens in the direction perpendicular to the longitudinal direction. In a case where the toric surface is formed on the relay lens unit 202 which is a light condensing lens unit, an image of the light source 201 extends in an optical axis direction, and it becomes difficult to adjust the luminous flux in the projection lens unit 203 with a simple structure. Therefore, a method of varying an optical characteristic of the projection lens unit 203 is advantageous in securing an optical performance. Therefore, it is preferable to dispose the toric surface on the projection lens unit 203 and adjust the light distribution characteristic of the light source 201. In this case, the number of lens elements of the projection lens unit 203 can preferably be reduced. Furthermore, it is preferable to weaken the refractive power of the projection lens unit 203 in the longitudinal direction of the light emitting section and strengthen the refractive power in the direction perpendicular to the longitudinal direction. In consequence, the luminous flux to be projected is easily condensed to obtain a satisfactory light projection precision. In addition, it is preferable that a lens, one surface of which is a flat surface and the other surface of which is a toric surface, is disposed on the projection lens unit 203. In consequence, during production of the lens, eccentricity dose not easily occur. The projection lens unit 203 may have a positive lens, one surface of which is a convex surface and the other surface of which is a toric surface. In consequence, the power of the toric surface can be weakened, and it is easy to mold the surface. A weak rotationally asymmetric power may be imparted to the relay lens unit 202, and a light condensed state may be adjusted in cooperation with the projection lens unit 203.

Figure 9:
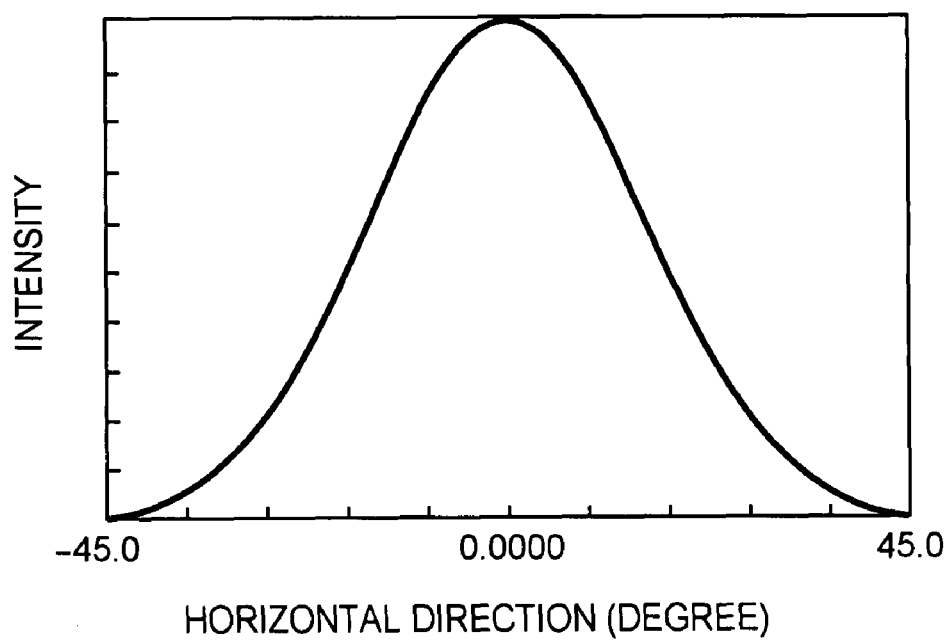
FIG. 9 illustrates a light distribution characteristic of the light source shown in FIGS. 1 to 8 in a horizontal direction.
Figure 10:
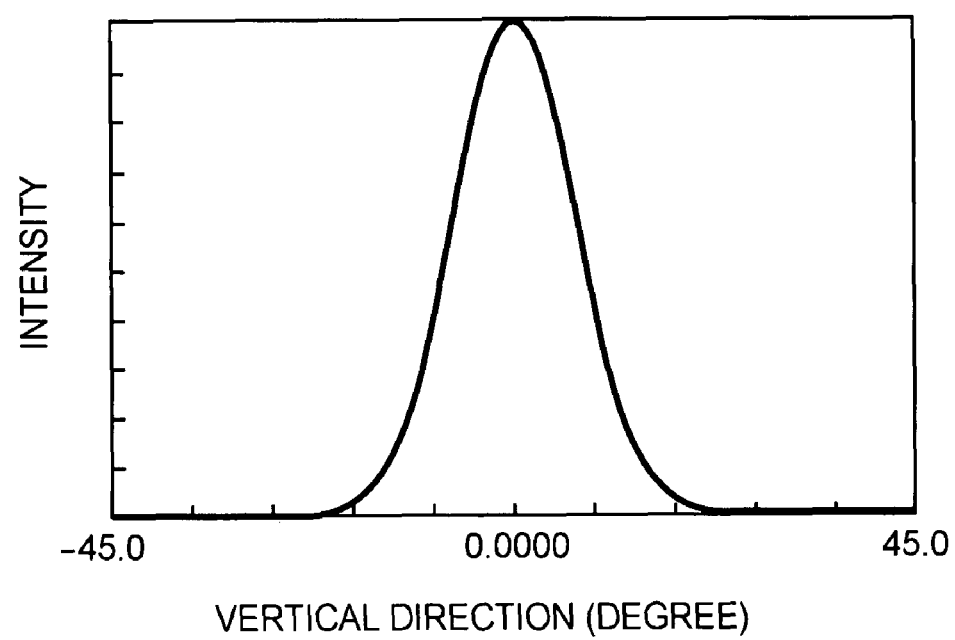
FIG. 10 illustrates a light distribution characteristic of the light source shown in FIGS. 1 to 8 in a vertical direction.

Next, specific examples of the light projection optical system will be described. In any of the following examples, it is assumed that the system is used in a distance measurement apparatus to be mounted on a car. In these examples, the light source 201 is a laser light source having an emission wavelength of 880 nm and is a linear light source of about 0.36 mm in a vertical direction perpendicular to the road surface. In optical path diagrams of the examples, the light source is exaggeratedly drawn to be long so that the longitudinal direction of the light source is easily seen. The light distribution characteristic of the light source 201 in the horizontal direction is shown in FIG. 9, and the light distribution characteristic in the vertical direction is shown in FIG. 10. As shown in FIGS. 9 and 10, it is assumed that a spread angle of the light source 201 is about 20° in the vertical direction (in the longitudinal direction of the light source) perpendicular to the road surface, and is about 60° in the horizontal direction (a direction perpendicular to the longitudinal direction of the light source). It is also assumed that the projection region is about 2.5° in the vertical direction (the longitudinal direction of the light source) and about 0.7° in the horizontal direction (the direction perpendicular to the longitudinal direction of the light source). The projection angle is minimized in a direction parallel to the road surface and maximized in the vertical direction.

EXAMPLE 1

Figure 11:
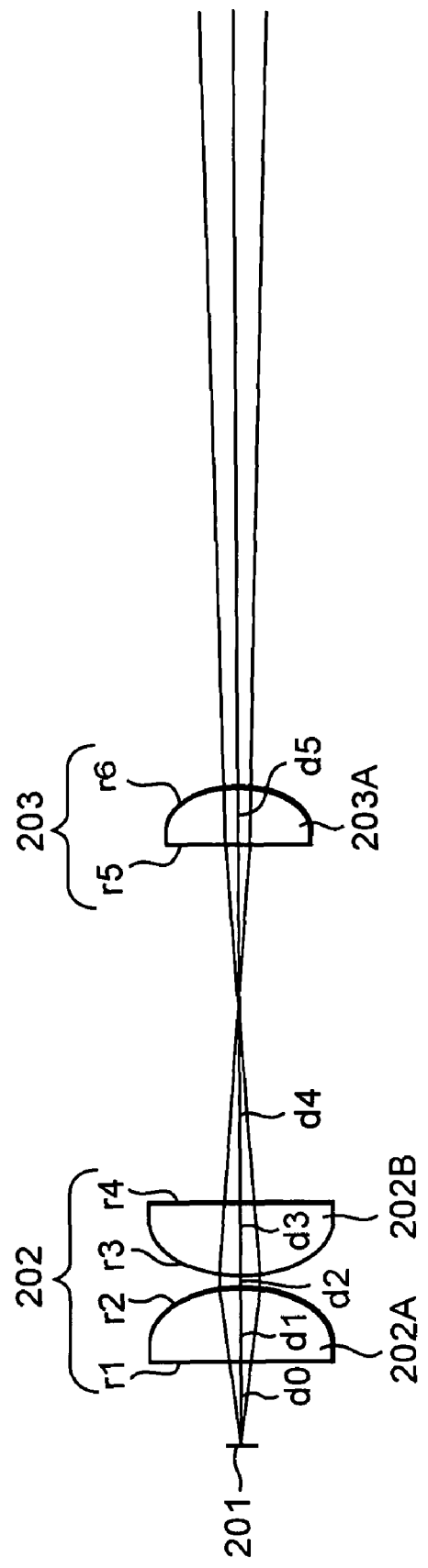
FIG. 11 is a sectional view of a light projection optical system of Example 1 in the vertical direction (a longitudinal direction of the light source) including a central ray which exits from the center of the light source.
Figure 12:
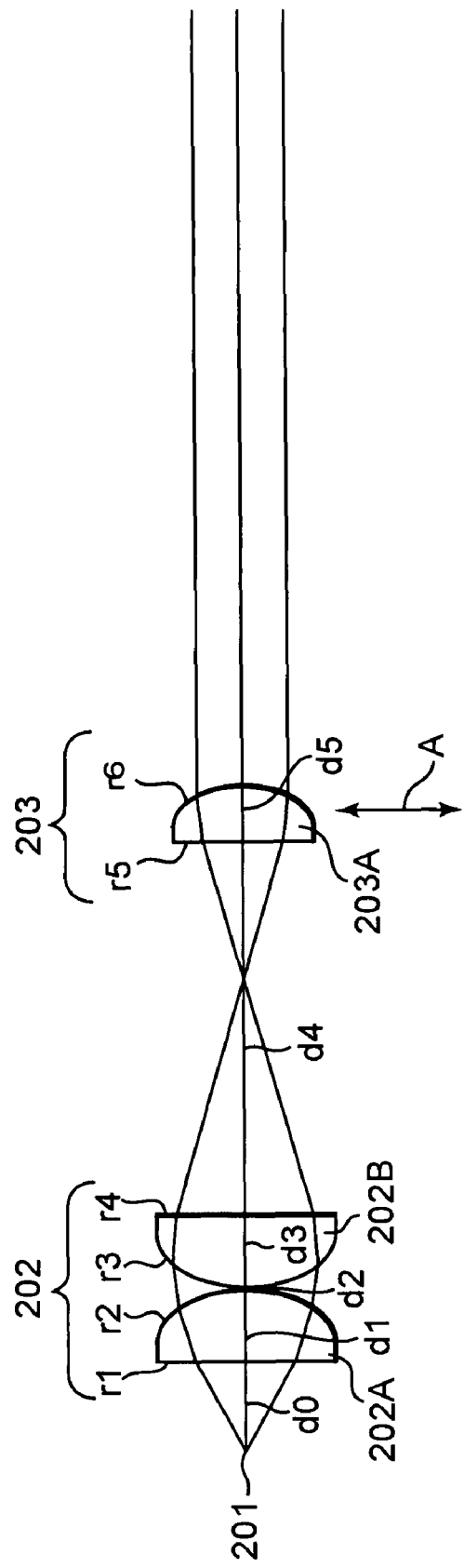
FIG. 12 is a sectional view of the light projection optical system of Example 1 in the horizontal direction including the central ray which exits from the center of the light source.

FIG. 11 is a sectional view of a light projection optical system according to Example 1 in a vertical direction (a longitudinal direction of a light source) including a central ray emitted from the center of the light source, and FIG. 12 is a sectional view in a horizontal direction. As shown in FIGS. 11 and 12, in this light projection optical system, a relay lens unit 202 includes two plano-convex lenses 202A and 202B, and a projection lens unit 203 includes one toric lens 203A.

The two plano-convex lenses 202A and 202B constituting the relay lens unit 202 are made of, for example, a resin, have the same shape and are arranged so that convex surfaces of the lenses face each other. The toric lens 203A constituting the projection lens unit 203 has a flat surface on a light source side, and a convex toric surface on a projection side on which there is a target.

The convex surfaces of the plano-convex lenses 202A and 202B of the relay lens unit 202 are provided with conical components in order to improve a light condensing property, and uniformity of an intensity distribution of projected light is improved. As shown by arrow A, the projection lens unit 203 may be decentered to move a projection region. Since the toric lens 203A of the projection lens unit 203 is molded of a resin, the toric surface can easily be formed. In this example, all of the lenses are made of the resin. However, when all or a part of the lenses is formed of a glass material, it is possible to reduce changes of characteristics at a time when the system is used in an environment having large changes of temperature and humidity.

Tables 1 to 4 show lens data of the light projection optical system according to Example 1. Tables 1 and 2 show lens data in a section of the lens in the vertical direction, and Tables 3 and 4 show lens data in a section of the lens in the horizontal direction. The convex surfaces of the two plano-convex lenses 202A, 202B constituting the relay lens unit 202, which face each other, are formed as aspherical surfaces which are rotationally symmetric quadratic surfaces. The toric surface of the lens constituting the projection lens unit 203, in the horizontal direction, is an aspherical surface whose section is a quadratic curve.

TABLE 1

Lens data

| | | | |
|---|---|---|---|
| | d0 = 5.00 | | |
| r1 = ∞ (flat surface) | d1 = 5.00 | n1 = 1.52346 | R1 = 5.00 |
| r2 = −6.00(*) | d2 = 0.20 | | R2 = 5.00 |
| r3 = 6.00(*) | d3 = 5.00 | n3 = 1.52346 | R3 = 5.00 |
| r4 = ∞ (flat surface) | d4 = 22.80 | | R4 = 5.00 |
| r5 = ∞ (flat surface) | d5 = 3.50 | n5 = 1.52346 | R5 = 4.50 |
| r6 = −6.20(#) | | | R6 = 4.50 |

TABLE 2

Aspherical surface coefficient

| | | | | |
|---|---|---|---|---|
| Second surface | K = −0.6600 | A4 = 0.0000 | A6 = 0.0000 | A8 = 0.0000 |
| Third surface | K = −0.6600 | A4 = 0.0000 | A6 = 0.0000 | A8 = 0.0000 |
| Sixth surface | K = 0.0000 | A4 = 0.0000 | A6 = 0.0000 | A8 = 0.0000 |

TABLE 3

Lens data

| | | | |
|---|---|---|---|
| | d0 = 5.00 | | |
| r1 = ∞ (flat surface) | d1 = 5.00 | n1 = 1.52346 | R1 = 5.00 |
| r2 = −6.00(*) | d2 = 0.20 | | R2 = 5.00 |
| r3 = 6.00(*) | d3 = 5.00 | n3 = 1.52346 | R3 = 5.00 |
| r4 = ∞ (flat surface) | d4 = 22.80 | | R4 = 5.00 |
| r5 = ∞ (flat surface) | d5 = 3.50 | n5 = 1.52346 | R5 = 4.50 |
| r6 = −5.63(#) | | | R6 = 4.50 |

TABLE 4

Aspherical surface coefficient

| Second surface | K = −0.6600 | A4 = 0.0000 | A6 = 0.0000 | A8 = 0.0000 |
| Third surface | K = −0.6600 | A4 = 0.0000 | A6 = 0.0000 | A8 = 0.0000 |
| Sixth surface | K = −0.8500 | A4 = 0.0000 | A6 = 0.0000 | A8 = 0.0000 |

In Tables 1 to 4, $r_1$, $r_2$ . . . are radiuses of curvatures of lens surfaces; $d_0$ is a space between the light source 201 and a lens surface of the relay lens unit 202 on an incidence side; $d_1$, $d_2$ . . . are spaces between the lens surfaces; $n_1$, $n_3$ . . . are refractive indexes of the lenses for the d-line; and $R_1$, $R_2$ are effective diameters of the lens surfaces. A symbol * attached to data of the radius of curvature indicates that the surface is an aspherical surface, and a symbol # indicates that the surface is a toric surface. It is to be noted that a shape of the aspherical surface is represented by the following equation in a coordinate system in which an intersection between the surface and the optical axis is an origin, an x-axis agrees with the optical axis (a travel direction of light is a positive direction) and a y-axis has an arbitrary direction passing through the origin and crossing the optical axis at right angles:

$$x=(y^2/r)/[1+\{1-(K+1)(y/r)^2\}^{1/2}]+A_4 y^4+A_6 y^6+A_8 y^8,$$

in which r is a paraxial radius of curvature, k is a conic constant, and $A_4$, $A_6$ and $A_8$ are 4-th, 6-th and 8-th order aspherical surface coefficients.

When a section of a surface in the vertical direction and a section of the surface in the horizontal direction have the same shape, the surface is a rotationally symmetric aspherical surface with respect to the optical axis. When a section of a surface in the vertical direction and a section of the surface in the horizontal direction have different shapes, the surface is a rotationally asymmetric aspherical surface such that the shape smoothly changes between the vertical direction and the horizontal direction, and the section in the vertical direction and the section in the horizontal direction are planes of symmetry of the aspherical surface.

A material having a refractive index of 1.52346 for the d-line is a resin (a state at a temperature of 40 degrees), and has a refractive index of 1.51595 with respect to light for use (a wavelength of 880 nm). FIGS. 11 and 12 are drawn for a use wavelength of 880 nm.

Figure 13:
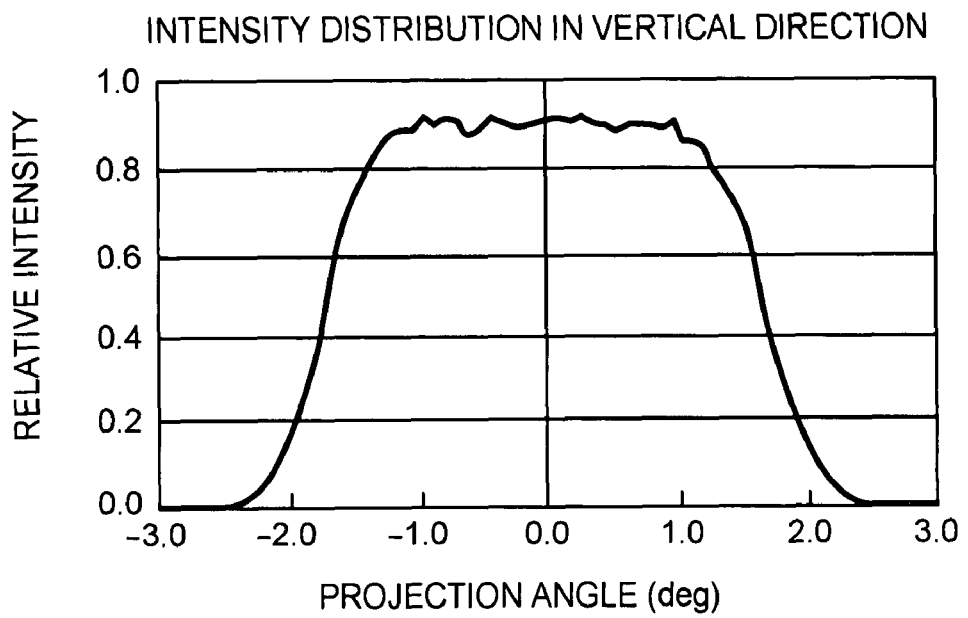
FIG. 13 illustrates an intensity distribution of the luminous flux projected by the light projection optical system shown in FIGS. 11 and 12 in the vertical direction.
Figure 14:
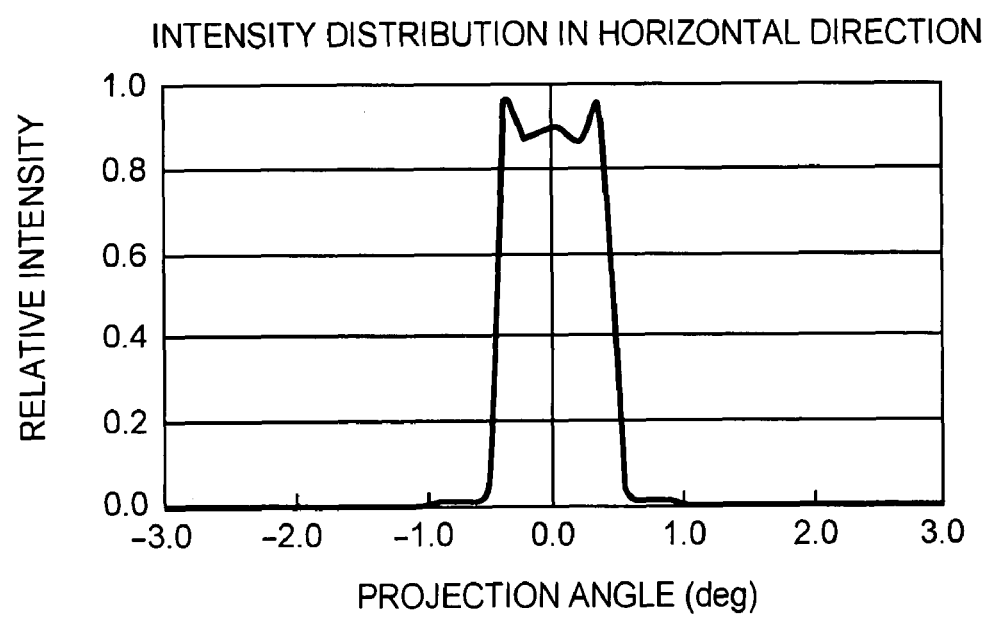
FIG. 14 illustrates an intensity distribution of the luminous flux projected by the light projection optical system shown in FIGS. 11 and 12 in the horizontal direction.

An intensity distribution of a luminous flux to be projected from the light projection optical system of Example 1 in the vertical direction is shown in FIG. 13, and an intensity distribution in the horizontal direction is shown in FIG. 14.

When the projection lens unit 203 is decentered (shifted or tilted) in the horizontal direction (a direction perpendicular to a longitudinal direction of the light source) with respect to the road surface, a projection region on a target side can be moved in the horizontal direction. When the projection lens unit 203 is fixed at the decentered position, the projection region is also fixed. When the projection lens unit 203 is continuously moved, the target can be scanned.

EXAMPLE 2

Figure 15:
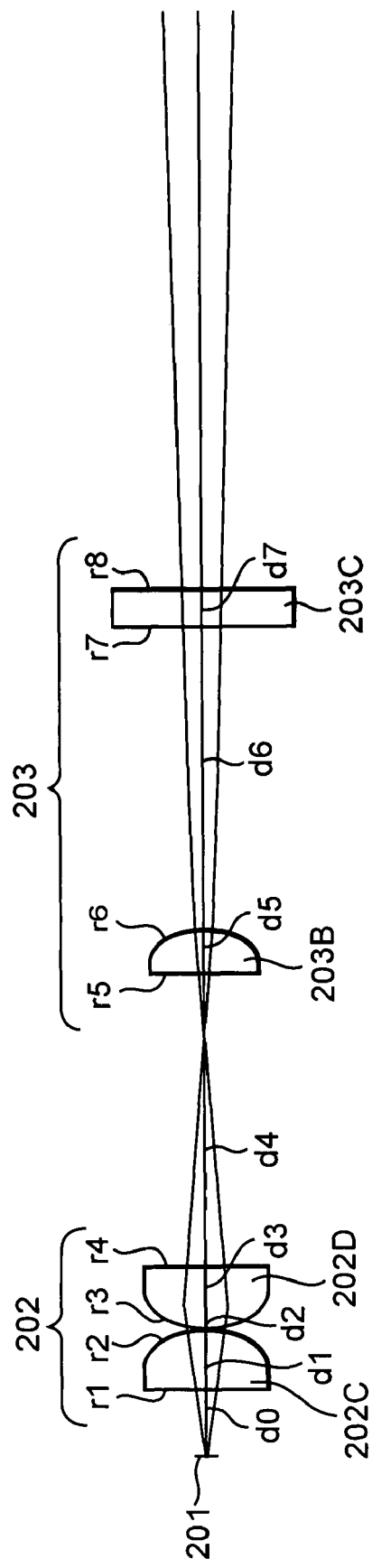
FIG. 15 is a sectional view of a light projection optical system of Example 2 in the vertical direction.
Figure 16:
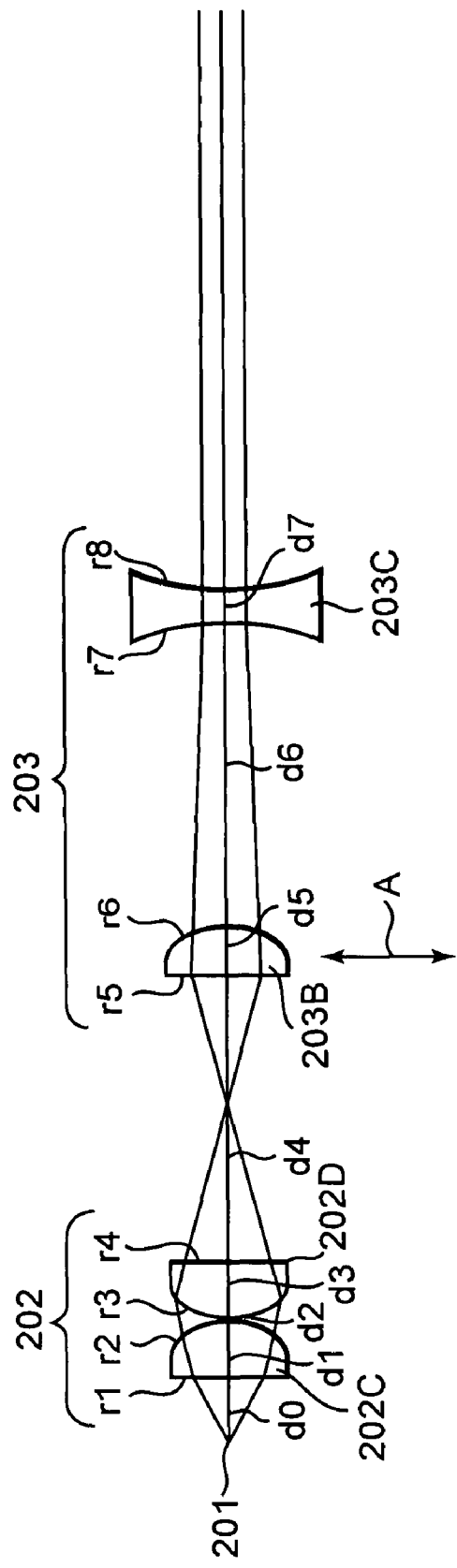
FIG. 16 is a sectional view of the light projection optical system of Example 2 in the horizontal direction.

FIG. 15 is a sectional view of a light projection optical system according to Example 2 in a vertical direction (a longitudinal direction of a light source) including a central ray emitted from the center of the light source, and FIG. 16 is a sectional view in a horizontal direction. As shown in FIGS. 15 and 16, in the light projection optical system of Example 2, a relay lens unit 202 includes two plano-convex lenses 202C and 202D, and a projection lens unit 203 includes a toric lens 203B and a cylindrical negative lens 203C. The projection lens unit 203 has a positive refractive power as a whole. The two plano-convex lenses 202C and 202D constituting the relay lens unit 202 are made of a resin, have the same shape and are arranged so that convex surfaces of the lenses face each other. The toric positive lens 203B of the projection lens unit 203 has a flat surface on a light source side, and a convex toric surface on a projection side. The cylindrical negative lens 203C of the projection lens unit 203 has cylindrical surfaces having a negative power as opposite surfaces. The cylindrical negative lens 203C is disposed at a sufficient interval from the projection side surface of the toric positive lens 203B.

The convex surfaces of the plano-convex lenses 202C and 202D of the relay lens unit 202 are provided with conical components in order to improve a light condensing property, and uniformity of an intensity distribution of projected light is improved in the same manner as in Example 1. The whole projection lens unit 203 may be decentered to move a projection region. The only toric positive lens 203B of the projection lens unit 203 may be decentered. The only cylindrical negative lens 203C of the projection lens unit 203 may be decentered. When the toric positive lens 203B is molded of a resin, the toric surface can easily be formed. It is to be noted that, when a glass material is used in all or a part of the lenses of the light projection optical system, it is possible to reduce changes of characteristics at a time when the system is used in an environment having large changes of temperature and humidity.

Tables 5 to 8 show lens data of the light projection optical system according to Example 2. Tables 5 and 6 show lens data in a section of the lens in the vertical direction, and Tables 7 and 8 show lens data in a section of the lens in the horizontal direction. The lens data is defined in the same manner as in Example 1. It is to be noted that a material having a refractive index of 1.8823 for the d-line is glass (a state at a temperature of 40 degrees), and a refractive index at a wavelength for use (a wavelength of 880 nm) is 1.86475.

TABLE 5

Lens data

| | d0 = 5.00 | | |
| r1 = ∞ (flat surface) | d1 = 5.00 | n1 = 1.52346 | R1 = 5.00 |
| r2 = 6.00(*) | d2 = 0.20 | | R2 = 5.00 |
| r3 = 6.00(*) | d3 = 5.00 | n3 = 1.52346 | R3 = 5.00 |
| r4 = ∞ (flat surface) | d4 = 24.40 | | R4 = 5.00 |
| r5 = ∞ (flat surface) | d5 = 4.00 | n5 = 1.52346 | R5 = 5.00 |
| r6 = −7.00(#) | d6 = 25.60 | | R6 = 5.00 |
| r7 = ∞ (cylindrical surface) | d7 = 3.00 | n7 = 1.52346 | R7 = 8.00 |
| r8 = ∞ (cylindrical surface) | | | R8 = 8.00 |

TABLE 6

Aspherical surface coefficient

| Second surface | K = −0.7050 | A4 = 0.0000 | A6 = 0.0000 | A8 = 0.0000 |
| Third surface | K = −0.7050 | A4 = 0.0000 | A6 = 0.0000 | A8 = 0.0000 |
| Sixth surface | K = 0.0000 | A4 = 0.0000 | A6 = 0.0000 | A8 = 0.0000 |

TABLE 7

Lens data

|  |  |  |  |
|---|---|---|---|
|  | d0 = 5.00 |  |  |
| r1 = ∞(flat surface) | d1 = 5.00 | n1 = 1.52346 | R1 = 5.00 |
| r2 = −6.00(*) | d2 = 0.20 |  | R2 = 5.00 |
| r3 = 6.00(*) | d3 = 5.00 | n3 = 1.52346 | R3 = 5.00 |
| r4 = ∞ (flat surface) | d4 = 24.40 |  | R4 = 5.00 |
| r5 = ∞ (flat surface) | d5 = 4.00 | n5 = 1.52346 | R5 = 5.00 |
| r6 = −4.60(#) | d6 = 25.60 |  | R6 = 5.00 |
| r7 = −20.00 (cylindrical surface) | d7 = 3.00 | n7 = 1.52346 | R7 = 8.00 |
| r8 = 20.00 (cylindrical surface) |  |  | R8 = 8.00 |

TABLE 8

Aspherical surface coefficient

| Second surface | K = −0.7050 | A4 = 0.0000 | A6 = 0.0000 | A8 = 0.0000 |
|---|---|---|---|---|
| Third surface | K = −0.7050 | A4 = 0.0000 | A6 = 0.0000 | A8 = 0.0000 |
| Sixth surface | K = −0.8500 | A4 = 0.0000 | A6 = 0.0000 | A8 = 0.0000 |

Figure 17:
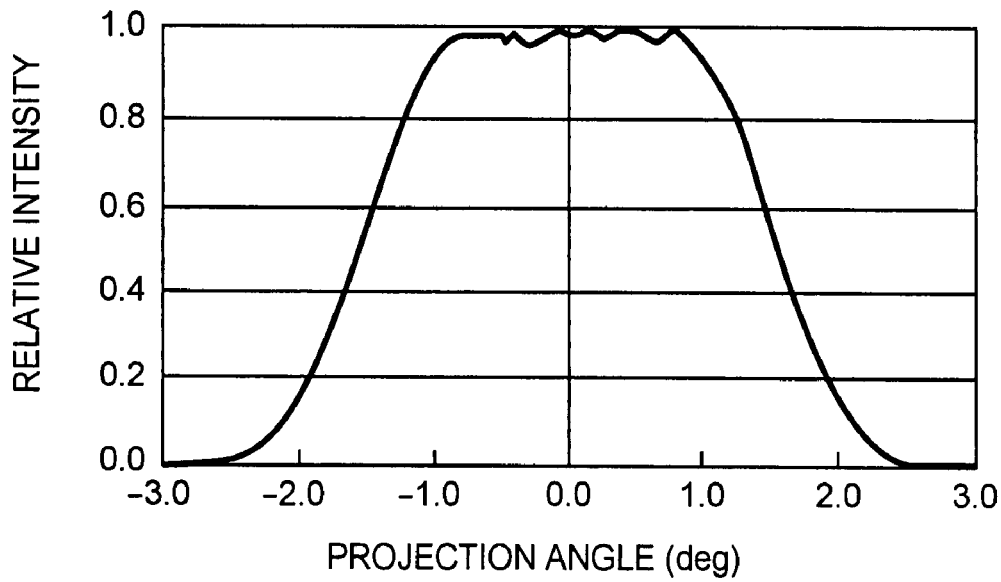
FIG. 17 illustrates an intensity distribution of the luminous flux projected by the light projection optical system shown in FIGS. 15 and 16 in the vertical direction.
Figure 18:
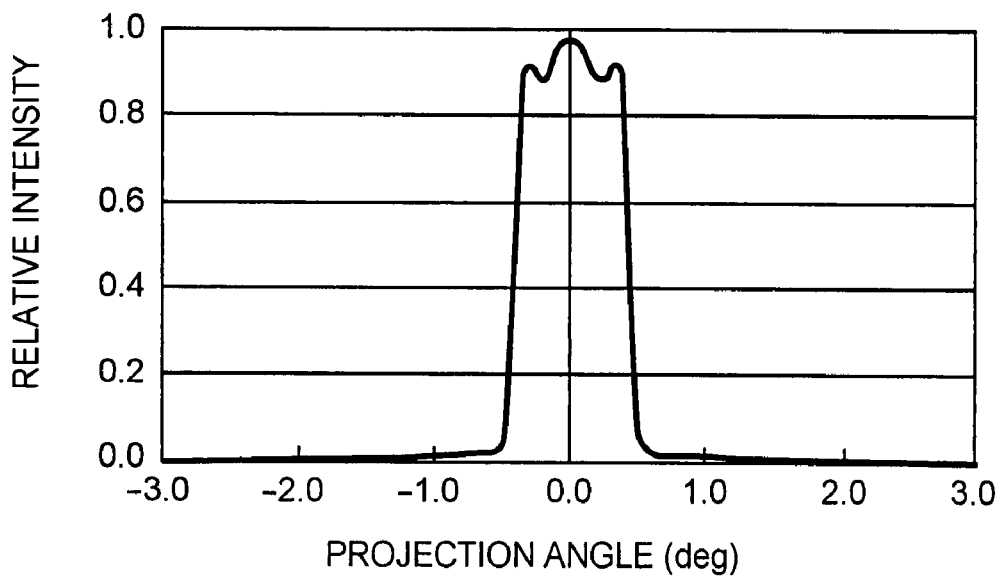
FIG. 18 illustrates an intensity distribution of the luminous flux projected by the light projection optical system shown in FIGS. 15 and 16 in the horizontal direction.

An intensity distribution of a luminous flux to be projected from the light projection optical system of Example 2 in the vertical direction is shown in FIG. 17, and an intensity distribution in the horizontal direction is shown in FIG. 18.

When the whole projection lens unit 203, the toric positive lens 203B or the cylindrical negative lens 203C is decentered (shifted or tilted) in a direction parallel to the road surface (a direction perpendicular to a longitudinal direction of the light source), a projection region on a target can be moved in the horizontal direction. When the projection lens unit 203, the toric positive lens 203B or the cylindrical negative lens 203C is fixed at the decentered position, the projection region is also fixed. When the projection lens unit 203, the toric positive lens 203B or the cylindrical negative lens 203C is continuously moved, a target can be scanned.

EXAMPLE 3

Figure 19:
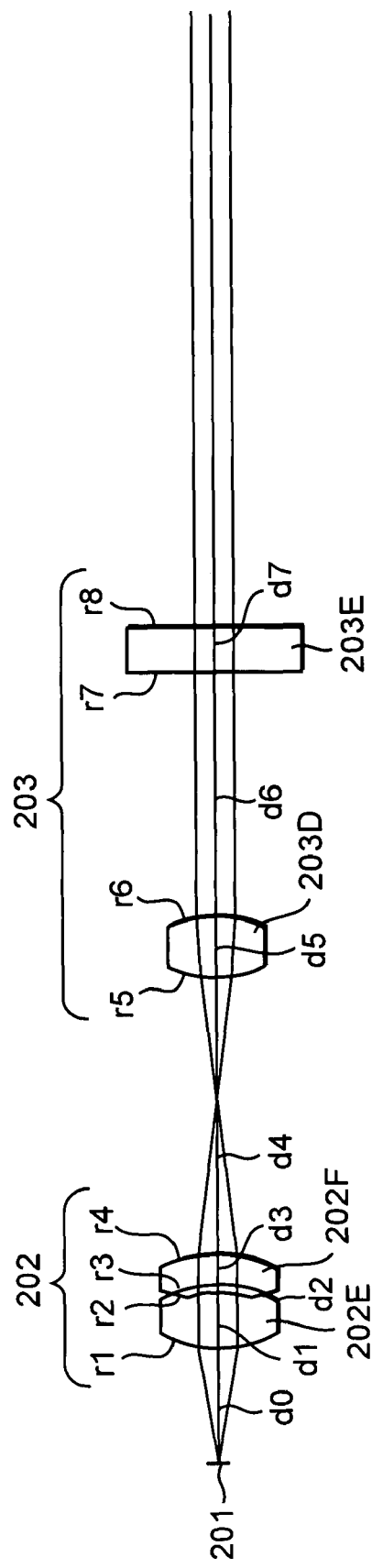
FIG. 19 is a sectional view of the light projection optical system of Example 3 in the vertical direction.
Figure 20:
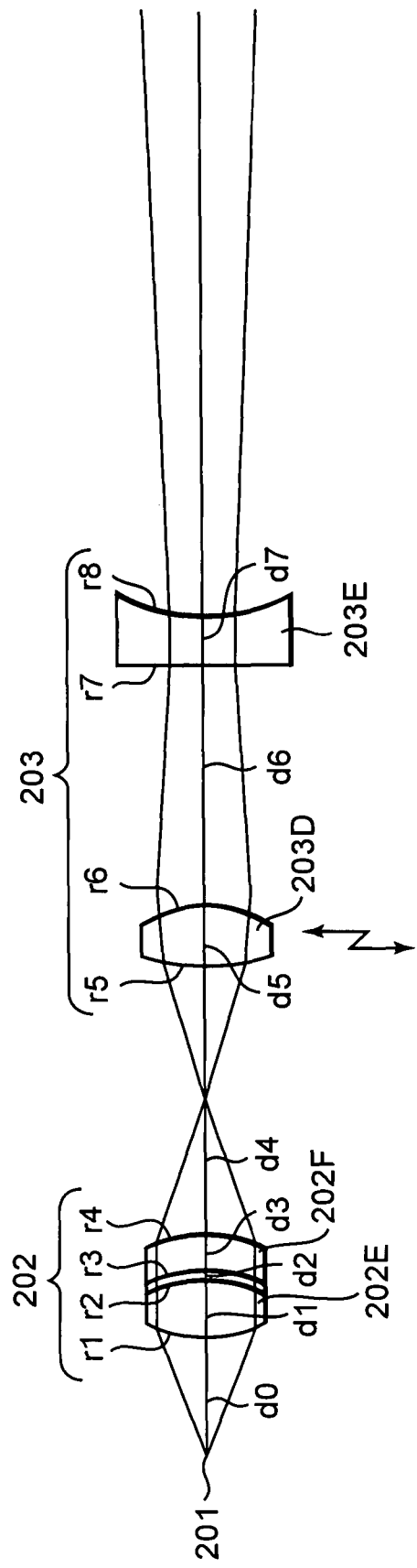
FIG. 20 is a sectional view of the light projection optical system of Example 3 in the horizontal direction.

FIG. 19 is a sectional view of a light projection optical system according to Example 3 in a vertical direction (a longitudinal direction of a light source) including a central ray emitted from the center of the light source, and FIG. 20 is a sectional view in a horizontal direction. As shown in FIGS. 19 and 20, in the light projection optical system of Example 3, a relay lens unit 202 includes a double convex lens 202E and a meniscus positive lens 202F, and a projection lens unit 203 includes a toric positive lens 203D and a cylindrical negative lens 203E. The projection lens unit 203 has a positive refractive power as a whole. The meniscus positive lens 202F of the relay lens unit 202 is disposed on a projection side of the double convex lens 202E, and has a strong convex surface on the projection side. The toric positive lens 203D of the projection lens unit 203 has a convex surface on a light source side, and a toric surface which is convex on the projection side. The cylindrical negative lens 203E of the projection lens unit 203 has a concave surface on the light source side, and a negative cylindrical lens surface on the projection side, and is disposed at a sufficient interval on the projection side of the toric positive lens 203D. The opposite surfaces of the meniscus positive lens 202F of the relay lens unit 202 are aspherical surfaces provided with conical components and classified as quadratic surface. Uniformity of an intensity distribution of projected light is improved. The whole projection lens unit 203 may be decentered to move a projection region. The only toric positive lens 203D or the only cylindrical negative lens 203E may be decentered. Alternatively, when the lens of the projection lens unit 203 is molded of a resin, the toric surface or the cylindrical surface can easily be formed. When the meniscus positive lens 202F of the relay lens unit 202 is formed of a glass material, it is possible to reduce changes of characteristics at a time-when the system is used in an environment where temperature and humidity comparatively largely change. Alternatively, when the double convex lens 202E is a spherical lens, the lens can easily be formed of the glass material.

Tables 9 to 12 show lens data of the light projection optical system according to Example 3. Tables 9 and 10 show lens data in a section of the lens in the vertical direction, and Tables 11 and 12 show lens data in a section of the lens in the horizontal direction. The lens data is defined in the same manner as in Example 1. It is to be noted that a material having a refractive index of 1.8823 for the d-line is glass (a state at a temperature of 40 degrees), and a refractive index at a wavelength for use (a wavelength of 880 nm) is 1.86475.

TABLES 9

Lens data

|  |  |  |  |
|---|---|---|---|
|  | d0 = 9.00 |  |  |
| r1 = 14.611 (spherical surface) | d1 = 4.50 | n1 = 1.88230 | R1 = 5.00 |
| r2 = −8.807 (spherical surface) | d2 = 0.50 |  | R2 = 5.00 |
| r3 = −10.570(*) | d3 = 3.00 | n3 = 1.52346 | R3 = 5.00 |
| r4 = −6.940(*) | d4 = 22.00 |  | R4 = 5.00 |
| r5 = 15.00 (spherical surface) | d5 = 5.00 | n5 = 1.52346 | R5 = 7.00 |
| r6 = −9.00(#) | d6 = 19.40 |  | R6 = 7.00 |
| r7 = −100.00 (spherical surface) | d7 = 4.00 | n7 = 1.52346 | R7 = 7.00 |
| r8 = ∞ (cylindrical surface) |  |  | R8 = 7.00 |

TABLE 10

Aspherical surface coefficient

| Third surface | K = 3.0000 | A4 = 0.0000 | A6 = 0.0000 | A8 = 0.0000 |
|---|---|---|---|---|
| Fourth surface | K = −4.0000 | A4 = 0.0000 | A6 = 0.0000 | A8 = 0.0000 |
| Sixth surface | K = 0.0000 | A4 = 0.0000 | A6 = 0.0000 | A8 = 0.0000 |

TABLE 11

Lens data

|  |  |  |  |
|---|---|---|---|
|  | d0 = 9.00 |  |  |
| r1 = 14.611 (spherical surface) | d1 = 4.50 | n1 = 1.88230 | R1 = 5.00 |
| r2 = −8.807 (spherical surface) | d2 = 0.50 |  | R2 = 5.00 |
| r3 = −10.570(*) | d3 = 3.00 | n3 = 1.52346 | R3 = 5.00 |
| r4 = −6.940(*) | d4 = 22.00 |  | R4 = 5.00 |
| r5 = 15.00 (spherical surface) | d5 = 5.00 | n5 = 1.52346 | R5 = 7.00 |
| r6 = −6.710(#) | d6 = 19.40 |  | R6 = 7.00 |
| r7 = −100.00 (spherical surface) | d7 = 4.00 | n7 = 1.52346 | R7 = 7.00 |
| r8 = 16.3 (cylindrical surface) |  |  | R8 = 7.00 |

TABLE 12

| Aspherical surface coefficient | | | | |
|---|---|---|---|---|
| Third surface | K = 3.0000 | A4 = 0.0000 | A6 = 0.0000 | A8 = 0.0000 |
| Fourth surface | K = −4.0000 | A4 = 0.0000 | A6 = 0.0000 | A8 = 0.0000 |
| Sixth surface | K = 0.25 | A4 = 4.51 × 10$^{-4}$ | A6 = 3.50 × 10$^{-5}$ | A8 = 2.09 = 10$^{-7}$ |

Figure 21:
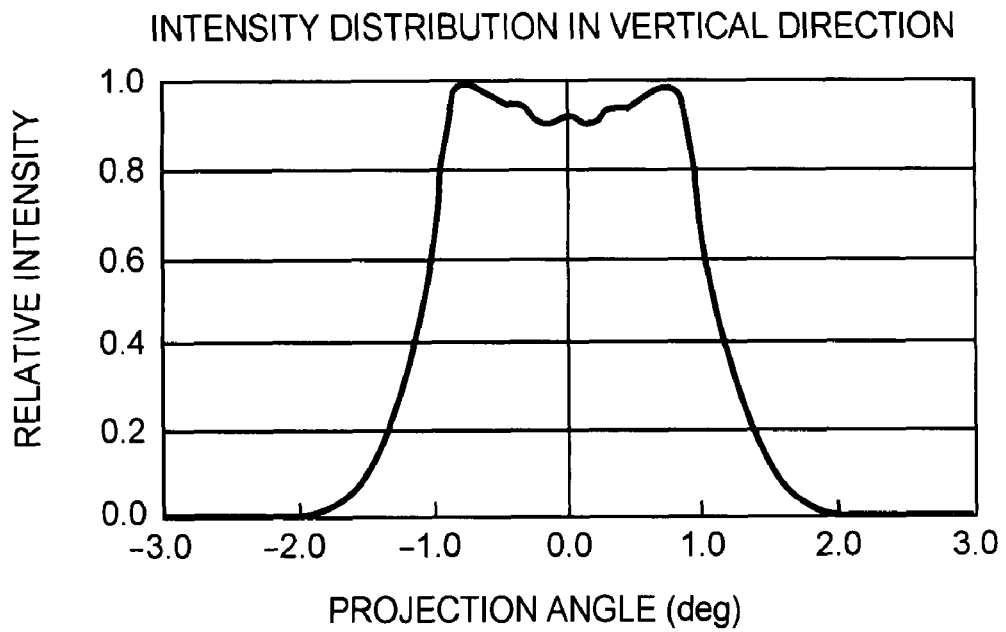
FIG. 21 illustrates an intensity distribution of the luminous flux projected by the light projection optical system shown in FIGS. 19 and 20 in the vertical direction.
Figure 22:
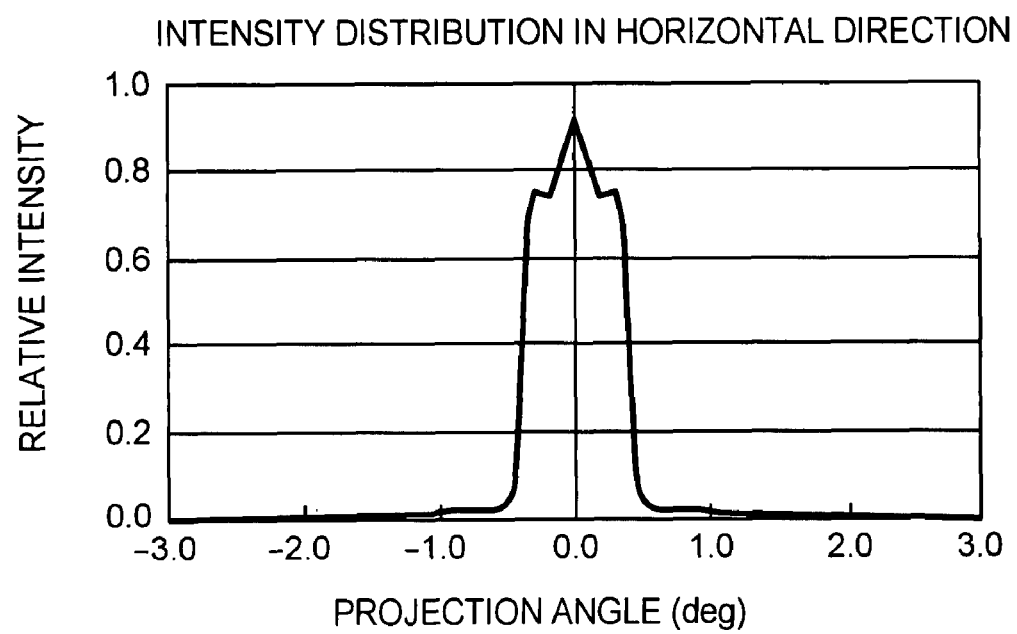
FIG. 22 illustrates an intensity distribution of the luminous flux projected by the light projection optical system shown in FIGS. 19 and 20 in the horizontal direction.

An intensity distribution of a luminous flux to be projected from the light projection optical system of Example 3 in the vertical direction is shown in FIG. 21, and an intensity distribution in the horizontal direction is shown in FIG. 22.

When the whole projection lens unit 203, the toric positive lens 203D or the cylindrical negative lens 203E is decentered (shifted or tilted) in a direction parallel to the road surface (a direction perpendicular to a longitudinal direction of the light source), a projection region on a target side can be moved in the horizontal direction. When the projection lens unit 203, the toric positive lens 203D or the cylindrical negative lens 203E is fixed at the decentered position, the projection region is also fixed. When the projection lens unit 203, the toric positive lens 203D or the cylindrical negative lens 203E is continuously moved, a target can be scanned.

In the light projection optical system of each example, since there is a sufficient space between the relay lens unit 202 and the projection lens unit 203, reflecting means may be disposed in this space to miniaturize the apparatus.

In the light projection optical systems of Examples 2 and 3, there is a sufficient space between the toric positive lens 203B or 203D and the cylindrical negative lens 203C or 203E of the projection lens unit 203, the reflecting means may be disposed in this space to miniaturize the apparatus.

Table 13 shows values related to conditions of the examples.

used as the support member. Two of the springs are shown in the drawing. Reference numeral 50 is a lens driving section including a linear motor, an ultrasonic motor or the like. The projection lens unit 203 is positioned by a mechanism including the support member 48 and the holder 12, and is movable in a direction of arrow 152 by the driving section 50 without changing a direction of an optical axis. Reference numeral 162 is a light receiving lens disposed at a predetermined distance from the light projection optical system, and 164 is a photo detector. As the light source 132, a laser diode, a light emitting diode, a semiconductor laser or the like may be used.

Laser light emitted from the light source 132 is projected to a target through the relay lens unit 202 and the projection lens unit 203. When a projection lens 10 attached to the holder 12 supported by the support member 48 is moved as shown by the arrow 152, the light to be projected from the projection lens to the target is swung left to right as shown by an arrow 154. As a result, positions of a projection region change within a range shown by rays 155 and 156, and the target is scanned. The projected light 156 is reflected by a target 158 to form return light 160. The light passes through the light receiving lens 162, and is received by the photo detector 164. It is possible to acquire positional information such as a distance, a direction and a movement speed of the target from

TABLE 13

|  | example 1 | | example 2 | | example 3 | |
|---|---|---|---|---|---|---|
|  | vertical | horizontal | vertical | horizontal | vertical | horizontal |
| βr | 2.3147 | 2.3147 | 2.3147 | 2.3147 | 1.2951 | 1.2951 |
| fr | 5.8653 | 5.8653 | 5.8653 | 5.8653 | 6.7593 | 6.7593 |
| fo | 12.0173 | 10.9152 | 13.5679 | 4.6107 | 11.2143 | 6.6690 |
| Drt | 12.2254 | 13.3302 | 11.0046 | 13.4814 | 7.8410 | 8.3728 |
| Dri | 13.5763 | 13.5763 | 13.5763 | 13.5763 | 8.6923 | 8.6923 |
| Φp | — | — | — | 0.1084 | 0.0852 | 0.1026 |
| Φn | — | — | — | −0.0529 | −0.0052 | −0.0372 |
| Dpn | — | — | — | 26.5599 | 20.7256 | 23.1639 |
| Φpl | — | — | — | — | 0.0327 | 0.0327 |
| Φgr | — | — | — | — | 0.1433 | 0.1433 |
| (1 + βr)(fr/|fo|) | 1.6178 | 1.7816 | 1.4329 | 4.2167 | 1.3833 | 2.3262 |
| Drt/Dri | 0.9005 | 0.9819 | 0.8106 | 0.9930 | 0.9021 | 0.9632 |
| Φp/Φn | — | — | — | −2.0491 | −16.5437 | −2.7581 |
| Dpn/fo | — | — | — | 5.7605 | 1.8481 | 3.4734 |
| fr · Φp | — | — | — | 0.6358 | 0.5759 | 0.6935 |
| Φpl/Φgr | — | — | — | — | 0.2282 | 0.2282 |

Figure 23:
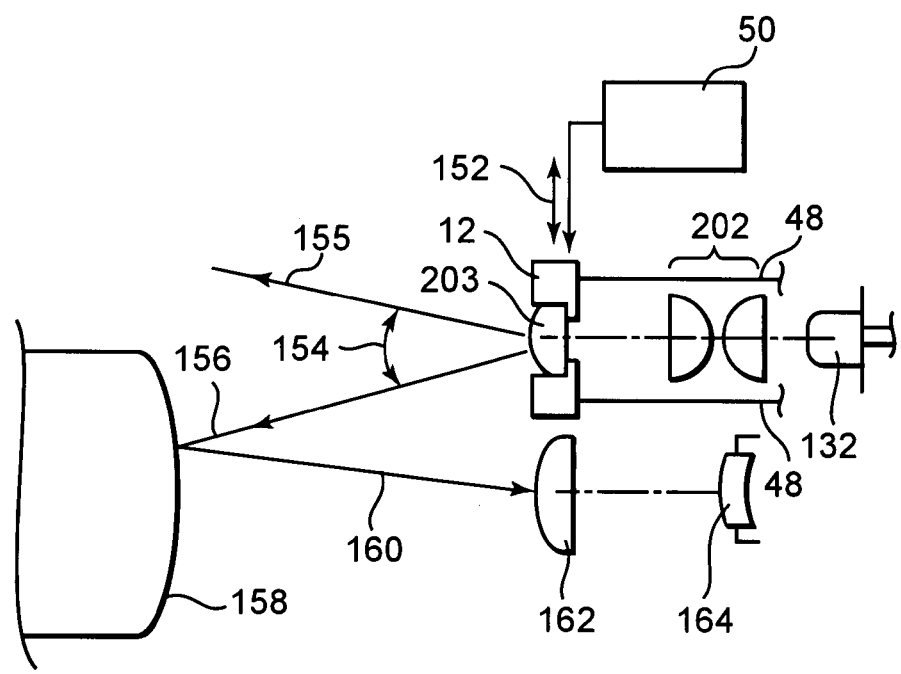
FIG. 23 is a diagram schematically illustrating a light projection apparatus including the light projection optical system of Example 1.

FIG. 23 is an explanatory view illustrating a constitution of a light projection apparatus including the light projection optical system of Example 1.

In the drawing, reference numeral 132 is a light source, 202 is a relay lens unit of the light projection optical system, and 203 is a projection lens unit. Reference numeral 12 is a holder which holds the projection lens unit, and 48 is a support member which supports the holder 12. Eight wire springs are a projection angle of the light 156 projected to the target and an incident position of the return light 160 on the photo detector 164.

It is to be noted that the projection lens unit 203 may be swung in not only the left-to-right direction but also a vertical direction. As a result, the light to be projected may vertically be swung.

From the above-mentioned examples, the following invention can be extracted.

(1) A light projection optical system comprises:

a light source;

a relay lens unit which has a negative lateral magnification and which converts a luminous flux that has diverged from the light source into converged light; and a projection lens unit which reduces a divergent angle of the luminous flux from the relay lens unit to convert a state of the luminous flux into a state close to that of a parallel luminous flux and which projects light toward a target region, wherein the following conditions are satisfied:

$$0.9 < \beta r < 3.0 \qquad (1); \text{ and}$$

$$1.0 < (1+\beta r)(fr/|fo|) < 6.0 \qquad (2),$$

in which $\beta r$ is an absolute value of the lateral magnification of the relay lens unit, fr is a focal length of the relay lens unit and fo is a focal length of the projection lens unit.

(Function and Effect)

The luminous flux emitted from the light source is condensed by the relay lens unit having the negative lateral magnification, and an image of the light source is formed (the image of the light source may be an actual image or a virtual image).

To convert the luminous flux from this image of the light source into a substantially parallel luminous flux by the projection lens unit, an image position of the light source may be allowed to appropriately come close to a focal point of the projection lens unit during arrangement.

In this arrangement, when an absolute value of a focal length of the projection lens unit is appropriately reduced, the projection lens unit can be arranged close to the image of the light source. Therefore, a diameter of the projection lens unit can be reduced.

The condition (1) defines an appropriate magnification range of a relay optical system, and is set in consideration of miniaturization of the relay lens unit to be achieved while securing an NA on the light source side to secure brightness.

When $\beta r$ is not below a lower limit of the condition (1), the NA of the relay lens unit 202 on a light condensing side (a projection lens unit side) is inhibited from being excessively increased, and (the absolute value of) the refractive power of the projection lens unit is reduced to easily maintain optical performances. Alternatively, the NA of the relay lens unit on the light source side is inhibited from being excessively decreased, and the brightness is easily secured.

When $\beta r$ is not above an upper limit condition (1), the image of the light source formed by the relay lens unit is inhibited from excessively coming away from the light source, and this constitution is advantageous for miniaturization of the relay lens unit.

In addition to the condition (1), the condition (2) is satisfied. The condition (2) defines a relation between the magnification and the focal length of the relay lens unit so as to set the focal length of the projection lens unit to be suitable for obtaining an appropriately small distance between the light source image and the projection lens unit.

When $(1+\beta r)(fr/|fo|)$ is not below a lower limit of the condition (2), an increase in a diameter of the projection lens unit is suppressed.

When $(1+\beta r)(fr/|fo|)$ is not above an upper limit of the condition (2), the absolute value of the refractive power of the projection lens unit is inhibited from being excessively increased, and the optical performance is easily secured.

Furthermore, it is preferable that an intensity distribution of the luminous flux emitted from the projection lens unit has energy (intensity) of 50% or more of that of the emitted luminous flux in a range of 5° or less of an angle from a central ray of the emitted luminous flux.

(2) A light projection optical system comprises:

a light source;

a relay lens unit which has a negative lateral magnification and which converts a luminous flux that has diverged from the light source into converged light; and a projection lens unit which reduces a divergent angle of the luminous flux from the relay lens unit to convert a state of the luminous flux into a state close to that of a parallel luminous flux and which projects light toward a target region, wherein the whole projection lens unit or a part of the projection lens unit is decentered to change a projection region.

(Function and Effect)

The luminous flux emitted from the light source is condensed by the relay lens unit, and an image of the condensed light of the light source is formed (the image of the light source may be an actual image or a virtual image).

To convert the luminous flux from this image of the light source into a substantially parallel luminous flux by the projection lens unit, an image position of the light source may be arranged to appropriately come close to a focal point of the projection lens unit.

The image of the light of the light source is formed as a spatial image by the relay lens unit. Therefore, since the position of the projection lens can arbitrarily be set with respect to the position of the light source image, the projection lens unit can be arranged close to the image of the light source to miniaturize the projection lens unit. A degree of freedom of the arrangement of the projection lens unit can be secured.

Moreover, when the relay lens unit is adjusted, an NA on a light source side is easily adjusted, and the projected luminous flux can easily be brightened.

When the whole or a part of the projection lens unit is decentered to change the projection region, the constitution can be simplified as compared with a case where a polygon mirror of a conventional technology is used.

Furthermore, it is preferable that an intensity distribution of the luminous flux emitted from the projection lens unit has energy (intensity) of 50% or more of that of the emitted luminous flux in a range of 5° or less of an angle from a central ray of the emitted luminous flux.

(3) The light projection optical system according to (2), wherein the relay lens unit satisfies the following condition:

$$0.9 < \beta r < 3.0 \qquad (1),$$

in which $\beta r$ is an absolute value of the lateral magnification of the relay lens unit.

(Function and Effect)

The light projection optical system is advantageous for securing brightness and miniaturizing the relay lens unit.

Technical significances of the upper limit and the lower limit of the condition (1) have been described above.

(4) The light projection optical system according to (3), wherein the relay lens unit and the projection lens unit satisfy the following condition:

$$1.0 < (1+\beta r)(fr/|fo|) < 6.0 \qquad (2),$$

in which fr is a focal length of the relay lens unit and fo is a focal length of the projection lens unit.

(Function and Effect)

When the focal length of the projection lens unit is appropriately reduced, the projection lens unit can appropriately be arranged close to the spatial image of the light source.

Therefore, a diameter of the projection lens unit can be reduced.

Especially, when the diameter of the projection lens unit is reduced, the projection lens unit (the whole or a part) to be moved can be reduced in size and weight, and burdens (a rigidity burden due to a weight, an energy burden required for the movement, etc.) on a movement mechanism can be reduced.

Technical significances of the upper limit and the lower limit of the condition (2) have been described above.

(5) The light projection optical system according to (1), wherein the projection lens unit has a positive refractive power.

(Function and Effect)

The refractive power (an inverse number of the focal length) of the projection lens unit may be either positive or negative. However, when the projection lens unit is constituted so as to have a positive refractive power, the projection lens unit can be arranged away from the relay lens unit. Therefore, interference with the relay lens unit does not easily occur. Since the absolute value of the refractive power can easily be reduced (the focal length can easily be lengthened), the constitution is advantageous in securing an optical performance of the projection lens unit.

(6) The light projection optical system according to any one of (2) to (4), wherein the projection lens unit has a positive refractive power.

(Function and Effect)

The refractive power (an inverse number of the focal length) of the projection lens unit may be either positive or negative. However, when the projection lens unit is constituted so as to have a positive refractive power, the projection lens unit can easily be arranged away from the relay lens unit. Therefore, interference with the relay lens unit does not easily occur. The constitution is preferable because the projection region can largely be moved with a small amount of eccentricity.

(7) The light projection optical system according to (5) or (6), wherein the light source comprises at least one of a plurality of point light sources, a linear light source and a planar light source.

(Function and Effect)

In a case where a light emitting section of the light source is linear, has an area or includes the plurality of point light sources, when the projection lens unit has the positive refractive power and the projection lens is arranged closer to a target side than to a light condensing position, the luminous flux can efficiently be taken from the light source, and a satisfactory intensity distribution can be obtained. That is, the luminous flux emitted from a peripheral portion of the light emitting section of the light source enters a peripheral portion of the projection lens unit. Therefore, when the lens has a spherical or aspherical sectional shape to strengthen the refractive power at the peripheral portion thereof, a substantially parallel luminous flux can easily be obtained.

(8) The light projection optical system according to any one of (1) to (7), wherein a light emitting section of the light source is linear or rectangular.

(Function and Effect)

When the light emitting section of the light source is linear or rectangular, a quantity of light to be emitted can be increased as compared with the point light sources.

(9) The light projection optical system according to any one of (1) to (8), wherein the projection lens unit has a positive refractive power and satisfies the following condition:

$$-0.1 < Drt/Dri < 1.1 \quad (3),$$

in which $Drt$ is a distance from a focal point of the relay lens unit on a target side to that of the projection lens unit on a light source side, and $Dri$ is a distance from the focal point of the relay lens unit on the target side to a conjugated image of the light source formed by the relay lens unit.

(Function and Effect)

In a case where the light source is an LED, a semiconductor laser or the like which is linear or which has an area or the light source includes a plurality of point light sources, light emitting points of the light source emit light having the highest intensity in a direction perpendicular to a direction in which the light emitting points of the light source (a direction substantially parallel to an optical axis of the relay lens unit in a case where the light emitting points are continuously arranged perpendicularly to the optical axis)are arranged. That is, to project the luminous fluxes emitted from the light emitting points in a specific direction, it is important to project the light emitted perpendicularly from the light emitting points of the light source in substantially the same direction. When the light source side focal point of the projection lens unit agrees with target side focal point of the relay lens unit, the rays emitted from the light emitting points of the light source in the vertical direction are projected substantially in parallel with each other (in the same direction) from the projection lens unit. At this time, marginal rays emitted from the light emitting points diverge. However, since the image of the light source is arranged close to the projection lens unit, the divergence is reduced as compared with the rays enter the projection lens unit. Moreover, the light source side focal point of the projection lens unit is positioned between the vicinity of the conjugated image of the light source formed by the relay lens unit and the vicinity of the target side focal point of the relay lens unit, an effect of reducing divergence of the light emitted from the light emitting points can be balanced with an effect of projecting chief rays (divergent rays having the high intensity) emitted from the light emitting points in the same direction.

When $Drt/Dri$ is not below a lower limit and also not above an upper limit of the condition (3), divergence of the luminous flux to be projected is easily suppressed.

It is to be noted that the position of the light source side focal point of the projection lens unit may be changed in a direction parallel to or perpendicular to the optical axis in accordance with a shape of the light emitting section of the light source.

(10) The light projection optical system according to any one of (1) to (9), wherein the projection lens unit comprises an optical unit having a positive refractive power and an optical unit having a negative refractive power in order from the light source side in a section of the projection lens unit including a central ray, and the projection lens unit has a positive refractive power as a whole, the optical unit having the positive refractive power is decentered to change the projection region, and the following condition is satisfied:

$$-6.0 < \Phi p/\Phi n < -1.5 \quad (4),$$

in which $\Phi p$ is a refractive power of the optical unit of the projection lens unit having the positive refractive power, and $\Phi n$ is a refractive power of the optical unit of the projection lens unit having the negative refractive power.

(Function and Effect)

Since the positive refractive power and the negative refractive power of the projection lens unit are arranged in order from the light source side, the divergent luminous flux from the image of the light source is condensed by the optical unit having the positive refractive power, and the optical unit having the negative refractive power can be miniaturized. A focal length of the optical unit having the positive refractive power can be set to be smaller than that of the projection lens unit. Therefore, this optical unit having the positive refractive power can be decentered to easily change the projection region with a small movement.

The condition (4) defines a ratio of the refractive powers of the optical units in order to reduce the movement of a movable unit constituting the projection lens unit.

When $\Phi p/\Phi n$ is not below a lower limit of the condition (4), the refractive power of the optical unit having the negative refractive power is secured, and the eccentricity of the positive refractive power can be suppressed.

When $\Phi p/\Phi n$ is not above an upper limit of the condition (4), the refractive power of the optical unit having the negative refractive power is prevented from being excessively increased, and the divergence of the marginal ray can easily be suppressed.

(11) The light projection optical system according to (10), wherein the optical unit having the positive refractive power includes one positive lens.

(Function and Effect)

Since only one lens of the projection lens unit is decentered, the movable lens unit can preferably be lightened. At this time, since the optical unit having the negative refractive power is arranged, spherical aberrations generated due to one positive lens can easily be cancelled, and a satisfactory intensity distribution of the projected luminous flux is advantageously obtained.

(12) The light projection optical system according to (11), wherein the following condition is satisfied in the section including the central ray:

$$2.5 < Dpn/fo < 7.0 \tag{5},$$

in which Dpn is an interval between a target side principal point of the optical unit having the positive refractive power and a light source side principal point of the optical unit having the negative refractive power, and fo is a focal length of the projection lens unit.

(Function and Effect)

Since the optical unit having the positive power is arranged away from the optical unit having the negative power, the refractive power of the positive lens of the projection lens unit can be reduced. This is preferable in view of correction of the aberrations.

When Dpn/fo is not below a lower limit of the condition (5), the refractive power of the positive lens unit can be suppressed. This constitution is advantageous in correcting the spherical aberrations.

When Dpn/fo is not above an upper limit of the condition (5), enlargement of the projection lens unit is suppressed.

(13) The light projection optical system according to (12), wherein the following condition is satisfied in the section including the central ray:

$$0.4 < fr \cdot \Phi p < 1.0 \tag{6},$$

in which fr is a focal length of the relay lens unit, and $\Phi p$ is a refractive power of the optical unit of the projection lens unit having the positive refractive power.

(Function and Effect)

When $fr \cdot \Phi p$ is not below a lower limit of the condition (6), the refractive power of the optical unit having the positive refractive power is secured, and any amount of eccentricity of the optical unit is advantageously suppressed.

When $fr \cdot \Phi p$ is not above an upper limit of the condition (6), the refractive power of the optical unit having the positive refractive power is inhibited from being excessively increased. Even in a simple constitution in which the optical unit having the positive refractive power includes one lens, the generation of the aberrations is reduced, and the optical performance is maintained.

(14) The light projection optical system according to any one of (1) to (13), wherein the relay lens unit comprises, in order from a light source side, a positive lens having a larger absolute value of curvature at the surface thereof on an emission side than at the surface thereof on the light source side, and a positive lens having a larger absolute value of curvature at the surface thereof on the light source side than at the surface thereof on the emission side.

(Function and Effect)

A divergent luminous flux from the light source is gradually refracted to form the conjugated image of the light source. Therefore, the constitution of the relay lens unit can be simplified, the NA on the light source side can be increased, and the spherical aberrations can be reduced. Therefore, owing to the increase of the NA together with an effect of the decrease of the aberrations, the uniformity of the intensity distribution of the light source image can be improved. Even if an area and a length of the light source increase, this constitution is advantageous in that influences of the aberrations can be reduced.

(15) The light projection optical system according to any one of (1) to (14), wherein the projection lens unit includes a resin lens and a glass lens having a positive refractive power, and the following condition is satisfied:

$$-0.25 < \Phi pl/\Phi gr < 0.5 \tag{7},$$

in which $\Phi gr$ is a refractive power of the glass lens of the relay lens unit, and $\Phi pl$ is a refractive power of the resin lens of the relay lens unit.

(Function and Effect)

This constitution is advantageous in a large range of temperature for use. When the refractive power to determine the focal length of the relay lens unit is imparted to the glass lens and the resin lens is used for correcting the spherical aberrations, the costs can be reduced, and additionally, influences of the temperature can be reduced.

The condition (7) determines a ratio between the refractive power of the glass lens and the refractive power of the resin lens in the relay lens unit.

When $\Phi pl/\Phi gr$ is not below a lower limit of the condition (7), the negative refractive power of the resin lens is inhibited from being excessively intensified, and influences of temperature changes can be reduced.

When $\Phi pl/\Phi gr$ is not above an upper limit of the condition (7), the positive refractive power of the resin lens is inhibited from being excessively intensified, and the influences of the temperature changes can be reduced.

(16) The light projection optical system according to (15), wherein the resin lens is an aspherical lens.

(Function and Effect)

The resin lens whose aspherical surface is easily formed is used for correcting the spherical aberrations. In consequence, the costs can be reduced. In addition, the influences of the temperature can be reduced.

(17) The light projection optical system according to any one of (1) to (16), wherein at least one lens surface of the projection lens unit is a toric surface, and when the relay lens unit and the projection lens unit are fixedly secured, a ratio between a projection angle in a narrow-angle direction and a projection angle in a direction perpendicular to the narrow-angle direction on a target side is 2 or more and 10 or less.

Here, the narrow-angle direction is a direction which is perpendicular to the central ray of the projected luminous flux and in which the smallest projection angle is obtained. The horizontal direction is a direction perpendicular to both of the central ray and the narrow-angle direction. It is assumed that flare and ghost light generated by a ray outside a normal optical path are not included in the projection angle range.

(Function and Effect)

In a case where a resolution required in measuring a target is not isotropic with respect to the central ray, a magnitude of an angle of the luminous flux projected from the light projection optical system, that is, a magnitude of the projection angle is varied with a direction in a plane perpendicular to the central ray. In consequence, an efficient system can be constituted. Therefore, it is preferable to set the ratio between the projection angle in the narrow-angle direction and the projection angle in the direction perpendicular to the narrow-angle direction to two or more by use of the toric surface.

When the ratio between the projection angle in the narrow-angle direction and the projection angle in the direction perpendicular to the narrow-angle direction is not above ten, the projection lens unit is easily prevented from being complicated.

In a case where the relay lens unit and the projection lens unit are fixedly secured, when the light is projected with a ratio exceeding ten between the projection angle in the narrow-angle direction and the projection angle in the direction perpendicular to the narrow-angle direction, the projection lens unit is complicated. Therefore, the constitution in which the projection lens unit is simplified and the light source or the lens of the optical system is moved to move the projection region is more advantageous for miniaturization.

In a case where the ratio between the magnitude of the projection region on the target side in the narrow-angle direction and that in the direction perpendicular to the narrow-angle direction is below two, to facilitate lens working of the optical system and assembling adjustment, a rotationally symmetric surface with respect to the optical axis is used as the lens surface to facilitate production of a lens element and the assembling. The projection region is saved in accordance with the shape and the number of the light sources. Alternatively, the light source or the lens is advantageously moved to move the projection region.

In a case where a relay optical system and the light projection optical system are fixedly secured, the ratio between the magnitude of the projection region in the narrow-angle direction and that in the direction perpendicular to the narrow-angle direction is set to two or more and ten or less by use of the toric surface. Furthermore, the light source or the lens of the optical system is moved. In such a combined constitution, the projection region may be moved.

(18) The light projection optical system according to any one of (1) to (17), wherein the light source is a light emitting diode or a semiconductor laser, a light emitting section of the light source is rectangular or linear, and the projection lens unit includes at least one lens surface which is a toric surface.

(Function and Effect)

When the light source is the light emitting diode (LED) or the semiconductor laser and the light emitting section of the light source is not a point light source and is rectangular or linear, a quantity of light of the light source can be increased. At this time, a light distribution characteristic of the light source differs with a longitudinal direction of the light emitting section and a direction perpendicular to the longitudinal direction. In a case where the luminous flux emitted from this light emitting section is substantially converted into a parallel luminous flux to project the luminous flux to the target, it is preferable to vary the characteristic of the optical system in the longitudinal direction and the vertical direction. As a method of varying the characteristic, there is considered a method of varying the characteristic of the relay lens unit and/or the projection lens unit. However, the light distribution characteristic has a tendency that the distribution narrows in the longitudinal direction of the light emitting section and widens in the direction perpendicular to the longitudinal direction.

In this case, when the toric surface is formed on the relay lens unit as a light condensing lens unit, an image of the light source elongates in an optical axis direction, and it becomes difficult to adjust the luminous flux in the projection lens unit with a simple structure.

Therefore, it is preferable that the light source image does not elongate in the optical axis direction and additionally, the optical system is adjusted in accordance with a divergence characteristic of the light source image. That is, a method of varying an optical characteristic of the projection lens unit instead of the relay lens unit as the light condensing lens is more advantageous in securing an optical performance. Therefore, it is preferable to form the toric surface on the projection lens unit and adjust the light distribution characteristic of the light source. In this case, the number of lens elements of the projection lens unit can preferably be reduced. Furthermore, it is preferable to weaken the refractive power of the projection lens unit in the longitudinal direction and strengthen the refractive power in the direction perpendicular to the longitudinal direction. In consequence, the luminous flux to be projected is easily condensed to preferably obtain a satisfactory light projection precision.

(19) The light projection optical system according to any one of (1) to (18), wherein at least one lens surface of the relay lens unit is an aspherical surface classified as a quadratic surface.

(Function and Effect)

When the lens surface of the relay lens unit is provided with an aspherical component classified as the quadratic surface, obliquely diverging rays can be converged to the center, and the intensity distribution of the emitted light can be uniformed.

(20) The light projection optical system according to any one of (1) to (19), wherein at least one lens surface of the relay lens unit has such an aspherical shape that a departure at a portion on the aspherical surface from a reference spherical surface to a space side increases as the portion comes away from an optical axis.

Here, the reference spherical surface is a virtual spherical surface having the same vertex as that of the aspherical surface and having a radius which is a paraxial radius of curvature of the aspherical surface.

(Function and Effect)

The spherical aberrations easily generated in a peripheral portion of the lens surface are easily suppressed. Even if the NA on the light source side is increased, a satisfactory optical performance can be obtained.

(21) The light projection optical system according to any one of (1) to (20), wherein the projection lens unit comprises an optical unit having a positive refractive power and an optical unit having a negative refractive power which are arranged in order from a light source side, the projection lens unit has a positive refractive power as a whole, the optical unit having the positive refractive power is decentered to change a projection region, and at least one lens surface of the projection lens unit is an aspherical surface.

(Function and Effect)

When the projection lens unit includes an optical unit having a positive refractive power and an optical unit having a negative refractive power in order from the light source side, a divergent luminous flux from an image of the light source is condensed by the optical unit having the positive refractive power, and the optical unit having the negative refractive power can be miniaturized. The focal length of the optical unit having the positive refractive power can be set to be smaller than that of the projection lens unit. Therefore, this optical unit having the positive refractive power can be decentered to easily change the projection region with a small movement. In such a constitution, the intensity distribution at a time when the positive optical unit is moved can be controlled by optimizing the aspherical shape of the projection lens unit.

It is to be noted that a constitution in which a part of the projection lens unit is decentered is more advantageous in a case where the projection region is moved to an arbitrary position, for example, a case where a known polygon mirror. This is because a space can be reduced. A method of decentering the optical unit may be a method of shifting the optical unit in a direction perpendicular to the optical axis of the relay lens unit or a method of tilting the optical axis of the optical unit with respect to that of the relay lens unit.

It is preferable that the above-mentioned conditions are limited as follows. In this case, the effects are more easily obtained.

It is more preferable to set a lower limit of the condition (1) to 1.1. It is more preferable to set an upper limit of the condition to 2.5.

It is more preferable to set a lower limit of the condition (2) to 1.2. It is more preferable to set an upper limit of the condition to 5.0.

It is more preferable to set a lower limit of the condition (3) to 0.1, further preferably 0.5. It is more preferable to set an upper limit of the condition to 1.0, further preferably 0.98.

It is more preferable to set a lower limit of the condition (4) to −3.5. It is more preferable to set an upper limit of the condition to −1.0.

It is more preferable to set a lower limit of the condition (5) to 3.0. It is more preferable to set an upper limit of the condition to 6.0.

It is more preferable to set a lower limit of the condition (6) to 0.55. It is more preferable to set an upper limit of the condition to 0.80.

It is more preferable to set a lower limit of the condition (7) to −0.3. It is more preferable to set an upper limit of the condition to 0.3.

(22) A light projection apparatus comprises:

the light projection optical system according to any one of (1) to (21); and a light receiving member including a detector which receives a luminous flux projected from the light projection optical system and reflected by a target in order to acquire positional information of the target.

(Function and Effect)

Since a light projection optical system can be miniaturized, the constitution is advantageous for miniaturization of the light projection apparatus to obtain the positional information of the target.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A light projection optical system comprising:
a light source;
a relay lens unit which has a negative lateral magnification and which converts a luminous flux that has diverged from the light source into converged light; and
a projection lens unit which reduces a divergent angle of the luminous flux from the relay lens unit to convert a state of the luminous flux into a state close to that of a parallel luminous flux and which projects light toward a target region,
wherein the following conditions are satisfied:

$$0.9 < \beta r < 3.0 \qquad (1); \text{ and}$$

$$1.0 < (1+\beta r)(fr/|fo|) < 6.0 \qquad (2),$$

in which $\beta r$ is an absolute value of the lateral magnification of the relay lens unit, fr is a focal length of the relay lens unit and fo is a focal length of the projection lens unit.

2. The light projection optical system according to claim 1, wherein the projection lens unit has a positive refractive power.

3. The light projection optical system according to claim 2, wherein the light source comprises at least one of a plurality of point light sources, a linear light source and a planar light source.

4. The light projection optical system according to claim 1, wherein a light emitting section of the light source is linear or rectangular.

5. The light projection optical system according to claim 1, wherein the projection lens unit has a positive refractive power and satisfies the following condition:

$$-0.1 < Drt/Dri < 1.1 \qquad (3),$$

in which Drt is a distance from a target side focal point of the relay lens unit to light source side focal point of the projection lens unit, and Dri is a distance from the target side focal point of the relay lens unit to an image of the light source formed by the relay lens unit.

6. The light projection optical system according to claim 1, wherein the projection lens unit comprises an optical unit having a positive refractive power and an optical unit having a negative refractive power in order from a light source side in a section of the projection lens unit including a central ray, and the projection lens unit has a positive refractive power as a whole, the optical unit having the positive refractive power is decentered to change a projection region, and the following condition is satisfied:

$$-6.0 < \Phi p/\Phi n < -1.5 \qquad (4),$$

in which $\Phi p$ is a refractive power of the optical unit of the projection lens unit having the positive refractive power, and Φn is a refractive power of the optical unit of the projection lens unit having the negative refractive power.

7. The light projection optical system according to claim 6, wherein the optical unit having the positive refractive power includes one positive lens.

8. The light projection optical system according to claim 7, wherein the following condition is satisfied in the section including the central ray:

$$2.5 < Dpn/fo < 7.0 \quad (5),$$

in which Dpn is an interval between a target side principal point of the optical unit having the positive refractive power and a light source side principal point of the optical unit having the negative refractive power, and fo is a focal length of the projection lens unit.

9. The light projection optical system according to claim 8, wherein the following condition is satisfied in the section including the central ray:

$$0.4 < fr \cdot \Phi p < 1.0 \quad (6),$$

in which fr is a focal length of the relay lens unit, and Φp is a refractive power of the optical unit of the projection lens unit having the positive refractive power.

10. The light projection optical system according to claim 1, wherein the relay lens unit comprises, in order from a light source side, a positive lens having a larger absolute value of curvature at the surface thereof on an emission side than at the surface thereof on the light source side, and a positive lens having a larger absolute value of curvature at the surface thereof on the light source side than at the surface thereof on the emission side.

11. The light projection optical system according to claim 1, wherein the projection lens unit includes a resin lens and a glass lens having a positive refractive power, and
the following condition is satisfied:

$$-0.25 < \Phi pl/\Phi gr < 0.5 \quad (7),$$

in which Φgr is a refractive power of the glass lens of the relay lens unit, and Φpl is a refractive power of the resin lens of the relay lens unit.

12. The light projection optical system according to claim 11, wherein the resin lens is an aspherical lens.

13. The light projection optical system according to claim 1, wherein at least one lens surface of the projection lens unit is a toric surface, and
when the relay lens unit and the projection lens unit are fixedly secured, a ratio between a projection angle in a narrow-angle direction and a projection angle in a direction perpendicular to the narrow-angle direction on a target side is 2 or more and 10 or less.

14. The light projection optical system according to claim 1, wherein the light source is a light emitting diode or a semiconductor laser,
a light emitting section of the light source is rectangular or linear, and
the projection lens unit includes at least one lens surface which is a toric surface.

15. The light projection optical system according to claim 1, wherein at least one lens surface of the relay lens unit is an aspherical surface classified as a quadratic surface.

16. The light projection optical system according to claim 1, wherein at least one lens surface of the relay lens unit has such an aspherical shape that a departure at a portion on the aspherical surface from a reference spherical surface to a space side increases as the portion comes away from an optical axis.

17. The light projection optical system according to claim 1, wherein the projection lens unit comprises an optical unit having a positive refractive power and an optical unit having a negative refractive power which are arranged in order from a light source side, the projection lens unit has a positive refractive power as a whole,
the optical unit having the positive refractive power is decentered to change a projection region, and
at least one lens surface of the projection lens unit is an aspherical surface.

18. A light projection apparatus comprising:
the light projection optical system according to claim 1; and
a light receiving member including a detector which receives a luminous flux projected from the light projection optical system and reflected by a target in order to acquire positional information of the target.

19. A light projection optical system comprising:
a light source;
a relay lens unit which has a negative lateral magnification and which converts a luminous flux that has diverged from the light source into converged light; and
a projection lens unit which reduces a divergent angle of the luminous flux from the relay lens unit to convert a state of the luminous flux into a state close to that of a parallel luminous flux and which projects light toward a target region,
wherein the whole projection lens unit or a part of the projection lens unit is decentered to change a projection region.

20. The light projection optical system according to claim 19, wherein the relay lens unit satisfies the following condition:

$$0.9 < \beta r < 3.0 \quad (1),$$

in which βr is an absolute value of the lateral magnification of the relay lens unit.

21. The light projection optical system according to claim 20, wherein the relay lens unit and the projection lens unit satisfy the following condition:

$$1.0 < (1+\beta r)(fr/|fo|) < 6.0 \quad (2),$$

in which fr is a focal length of the relay lens unit and fo is a focal length of the projection lens unit.

22. The light projection optical system according to claim 19, wherein the projection lens unit has a positive refractive power.

* * * * *